United States Patent [19]

Kadota

[11] Patent Number: 5,778,198
[45] Date of Patent: Jul. 7, 1998

[54] DATA TRANSFERRING METHOD AND SYSTEM UTILIZING A TRANSFER-RELATED WAITING TIME

[75] Inventor: Masatoshi Kadota, Takahama, Japan

[73] Assignee: Brother Kogyo Kabushiki Kaisha, Nagoya, Japan

[21] Appl. No.: 661,637

[22] Filed: Jun. 11, 1996

[30] Foreign Application Priority Data

Jun. 14, 1995 [JP] Japan .................. 7-172799

[51] Int. Cl.$^6$ .................. G06F 13/00; H04L 7/00
[52] U.S. Cl. .................. 395/286; 395/200.62; 395/853
[58] Field of Search .................. 395/285, 286, 395/853, 200.62, 615; 358/403; 370/517, 519; 375/219

[56] References Cited

U.S. PATENT DOCUMENTS

| | | | |
|---|---|---|---|
| 4,081,842 | 3/1978 | Harbaugh et al. | 358/409 |
| 4,203,136 | 5/1980 | Wellendorf et al. | 358/448 |
| 4,779,190 | 10/1988 | O'Dell et al. | 395/500 |
| 4,947,268 | 8/1990 | Nakajiri | 358/426 |
| 5,291,592 | 3/1994 | Kita | 395/615 |
| 5,408,506 | 4/1995 | Mincher et al. | 375/356 |
| 5,508,821 | 4/1996 | Murata | 358/442 |
| 5,584,033 | 12/1996 | Barrett et al. | 395/285 |
| 5,657,461 | 8/1997 | Harkins et al. | 395/333 |

*Primary Examiner*—Gopal C. Ray
*Attorney, Agent, or Firm*—Oliff & Berridge, PLC

[57] ABSTRACT

A method of transferring transfer data from a data transmitter to a data receiver, the data transmitter transmitting each of a plurality of unit amounts of the transfer data, to the data receiver, in response to a corresponding one of a plurality of transfer-data transmission command signals which are generated by the data receiver and supplied to the data transmitter, the method including the step of changing a transfer-related waiting time between a timing of generation of the one transfer-data transmission command signal by the data receiver and a timing of reading-in of the each unit amount of transfer data by the data receiver, so that the data receiver reads in, after waiting for the changed transfer-related waiting time, the each unit amount of transfer data transmitted thereto from the data transmitter.

35 Claims, 11 Drawing Sheets

DATA TRANSFERRING METHOD AND SYSTEM UTILIZING A TRANSFER-RELATED WAITING TIME

BACKGROUND OF THE INVENTION

1. Field of the Invention

The present invention relates to a data transferring method and a data transferring system and in particular to such a method and a system for transferring data between a data transmitter and a data receiver.

2. Related Art Statement

There is known an image scanner, as one of electronic devices, which optically reads an image from an original, produces image data representing the read image, and transmits the image data in parallel form to a host computer, such as a personal computer. The image scanner includes a centronics connector and a centronics communication port through which the image data are transmitted to the host computer via a connection cable or cord.

Meanwhile, the host computer includes a centronics connector and a centronics communication port through which the computer receives the image data in parallel form transmitted from the image scanner via the connection cord.

The host computer may be connected to, e.g., a laser printer so that the computer may transmit, to the printer, the image data received from the image scanner or the image data produced by itself.

Recently, a centronics communication method in which a parallel interface in accordance with IEEE Standard 1284 (IEEE is Institute of Electrical and Electronics Engineers) is used, has been reduced to practice. For example, in a data transferring system provided by a host computer and an image scanner which are connected to each other via a connection cord, image data produced by the image scanner from an original may be transmitted one byte by one, i.e., in unit of one byte to the host computer using the IEEE 1284 parallel interface. In this case, each time a host busy signal, H.Busy, transmitted from the host computer to the image scanner falls from a high voltage level to a low voltage level, the image scanner prepares one byte of image data and outputs the one-byte data through a transmitter circuit thereof, in response to each fall of the H.Busy signal. Simultaneously, the image scanner causes a printer clock signal, P.CLK, transmitted therefrom to the host computer to fall from a high level to a low level. At the timing of each fall of the P.CLK signal, the host computer reads in the one-byte data transmitted from the image scanner. Thus, the host computer can read in, with accuracy, each byte of data transmitted from the image scanner.

The above-described centronics communication method in accordance with the IEEE Standard 1284 is called a "hand-shake" method, because in a data transferring system provided by a host computer and an image scanner connected to each other via a connection cord, each byte of image data are transferred from the image scanner to the host computer while a P.CLK signal falls in response to each fall of a H.Busy signal and the H.Busy signal falls in response to each fall of the P.CLK signal. The hand-shake data transfer method, however, suffers from the problem that it needs a long time to make a hand shake between the host computer and the image scanner and accordingly it needs a long time of about 30 to 35 μsec to transfer one byte of image data from the scanner to the computer. That is, the speed of transfer of image data is very low.

In the above-described background, the Applicant of the present U.S. patent application had conceived the idea of utilizing, as a data-transmission command signal, each rise of a H.Busy signal from a low level to a high level, in addition to each fall of the H.Busy signal. In this idea, an image scanner transmits, to a host computer, one byte of image data at the timing of each fall and each rise of the H.Busy signal transmitted from the host computer to the image scanner, and does not transmit a printer clock signal, P.CLK to the computer. This idea is illustrated in FIG. 12 in which one bit, D1, represents eight bits of one-byte data. According to the Applicant's idea, the centronics communication method in accordance with the IEEE Standard 1284 is improved and the speed of transfer of image data is increased.

However, in the Applicant's idea, illustrated in FIG. 12, in which each byte of image data are transmitted from an image scanner to a host computer at the timing of each transmission command signal provided by each fall and rise of a H.Busy signal transmitted from the computer to the scanner, different connection cords each of which may be used to connect between the computer and the scanner may have different time constants, because respective specific capacitances or strays, C, resistances, R, and inductances, L, of those connection cords may differ from each other, i.e., the connection cords may have different lengths and/or different diameter or thickness values, may be of different types (e.g., ribbon type, coaxial type, etc.), or may be used under different conditions or environments. Therefore, depending upon different connection cords, the waveform of each fall or rise of the H.Busy signal received by the image scanner, and the waveform of the image data D1 received by the host computer may be deformed in different manners. That is, those waveforms may be subject to different exponential response delays.

In the time chart of FIG. 12, when the H.Busy signal generated by the host computer falls at a timing, T10, the image scanner identifies, as a transmission command signal, the fall (i.e., low level) of the H.Busy signal at a timing, T11, based on a reference threshold, p1, because the above-indicated response delay is produced while the low-level H.Busy signal is transmitted from the computer to the scanner via the connection cord employed to connect between the computer and the scanner. When, at the timing T11, the image scanner transmits the image data D1 with the high level to the host computer, the computer identifies the high-level image data D1 based on a reference threshold, p2, at a delayed timing, T12.

However, those delay times may change depending upon the sorts of the connection cords employed and/or the conditions under which the cords are used. Accordingly, an additional waiting time, t12, which can sufficiently accommodate possible changes of the delay times is added to the sum of a delay time, t10, from the timing T10 to the timing T11 and a delay time, t11, from the timing T11 to the timing T12. Accordingly, at a timing, T13, after T12 by the waiting time t12, the host computer starts to read in the image data D1 and, at a timing, T14, after T13 by a data processing time t13, the computer causes the H.Busy signal to rise as another transmission command signal to command the image scanner to transmit another byte of image data. Thus, the above-indicated Applicant's idea has the problem that the speed of data transfer cannot sufficiently be increased because of the employment of the waiting time t12.

SUMMARY OF THE INVENTION

The first object of the present invention is to provide a data transferring method in which data is transferred from a data transmitter to a data receiver at high speed and with high accuracy.

The second object of the present invention is to provide a data transferring system in which data are transferred from a data transmitter to a data receiver at high speed and with high accuracy.

The third object of the present invention is to provide a recording medium in which a control program to control a computer to receive data from a data transmitter at high speed and with accuracy is recorded.

The first object has been achieved according to a first aspect of the present invention, which provides a method of transferring transfer data from a data transmitter to a data receiver, the data transmitter transmitting each of a plurality of unit amounts of the transfer data, to the data receiver, in response to a corresponding one of a plurality of transfer-data transmission command signals which are generated by the data receiver and supplied to the data transmitter, the method comprising the step of changing a transfer-related waiting time between a timing of generation of said one transfer-data transmission command signal by the data receiver and a timing of reading-in of said each unit amount of transfer data by the data receiver, so that the data receiver reads in, after waiting for the changed transfer-related waiting time, said each unit amount of transfer data transmitted thereto from the data transmitter.

In the data transferring method in accordance with the first aspect of the invention, the data transmitter and the data receiver may physically be connected with each other either via a connection cord or cable, or in a wireless manner, e.g., by utilizing radio wave or light. In the case where the two devices are connected with each other via a connection cable, the waveform of each transfer-data transmission command signal received by the data transmitter, or the waveform of each unit amount of transfer data received by the data receiver is deformed due to an exponential response delay that is attributable to a capacitance or stray C, a resistance R, and an inductance L which are specific to the connection cable connecting between the two devices. The degree of deformation of the signal or data depends on the physical properties of the medium (cable, space, etc.) connecting the two devices and/or the physical conditions under which the two devices and the medium are used. Since in the present data transferring method the transfer-related waiting time is changeable, the transfer data can be transferred from the data transmitter to the data receiver at high speed and with high accuracy or reliability.

According to a preferred feature of the first aspect of the invention, the step of changing the transfer-related waiting time comprises performing a test which includes generating a plurality of test-data transmission command signals, transmitting each of a plurality of unit amounts of test data, in response to a corresponding one of the test-data transmission command signals, reading in the each unit amount of test data after waiting for a test-related waiting time from a timing of generation of the one test-data transmission command signal, judging whether the read-in each unit amount of test data is identical with a corresponding one of a plurality of unit amounts of comparison data which are same as the test data, and increasing the test-related waiting time between the timing of generation of the one test-data transmission command signal and a timing of reading-in of the each unit amount of test data, by a predetermined time, when it is judged that the read-in each unit amount of test data is not identical with the one unit amount of comparison data, repeating the test to obtain a shortest test-related waiting time when it is first judged that the read-in each unit amount of test data is identical with the one unit amount of comparison data, and changing, based on the shortest test-related waiting time, the transfer-related waiting time such that the changed transfer-related waiting time is not shorter than the shortest test-related waiting time. If it is judged that the read-in each unit amount of the test data is not identical with the corresponding one unit amount of the comparison data that are the same as the test data, the judgment means that the current test-related waiting time is shorter than an actual total delay time that is equal to the sum of a time of delay of the test-data transmission command signal and a time of delay of the test data. Accordingly, the current test-related waiting time is increased or prolonged by the predetermined time. Eventually, the shortest test-related waiting time that is substantially equal to, or somewhat longer than, the total delay time is determined or obtained. Since the data receiver starts to read in each unit amount of transfer data after waiting for at least the shortest test-related waiting time, the computer can read in the transfer data with high accuracy. In addition, since the data receiver waits for the shortest waiting time only, the speed of data transfer from the data transmitter to the data receiver can be optimized under the given conditions. The test data may be exclusive data different from the transfer data, or a portion of the transfer data to be transferred. In the former case, the test data may be pre-stored in a memory of one or each of the data transmitter and receiver, or may be produced using, e.g., a signal generator and a signal counter, by one or each of the data transmitter and receiver. In the latter case, the test data may be transmitted from one of the data transmitter and receiver, to the other, and subsequently be transmitted back to that one device, so that the portion of the transfer data as the test data may be compared with a corresponding portion of the transfer data. The test data may be transmitted between the data transmitter and receiver one or more times. As the times of transmission of the test data increases, the degree of accuracy of the test increases. The test may be performed by the cooperation of the two devices only, or the two devices and a third device which is connectable to one or both of the two devices.

According to another feature of the first aspect of the invention, the step of performing the test comprises operating one of the data receiver and the data transmitter to generate the test-data transmission command signals and supply the test-data transmission command signals to the other of the data receiver and the data transmitter, operating the other of the data receiver and the data transmitter to transmit the each unit amount of test data, in response to the one test-data transmission command signal, to the one of the data receiver and the data transmitter, and operating the one of the data receiver and the data transmitter to read in the each unit amount of test data after waiting for the test-related waiting time.

According to another feature of the first aspect of the invention, the step of performing the test comprises operating one of the data receiver and the data transmitter to judge whether the read-in each unit amount of test data is identical with the one unit amount of comparison data.

According to another feature of the first aspect of the invention, the step of performing the test comprises operating one of the data receiver and the data transmitter to increase the test-related waiting time by the predetermined time, when it is judged that the read-in each unit amount of test data is not identical with the one unit amount of comparison data.

The second object has been achieved according to a second aspect of the present invention, which provides a system including a data transmitter and a data receiver, for transferring transfer data from the data transmitter to the data receiver, the data transmitter transmitting each of a plurality of unit amounts of the transfer data, to the data receiver, in response to a corresponding one of a plurality of transfer-data transmission command signals which are generated by the data receiver and supplied to the data transmitter, wherein the improvement comprises waiting-time changing means for changing a transfer-related waiting time between a timing of generation of the one transfer-data transmission command signal by the data receiver and a timing of reading-in of the each unit amount of transfer data by the data receiver, so that the data receiver reads in, after waiting for the changed transfer-related waiting time, the each unit amount of transfer data transmitted thereto from the data transmitter.

In the data transferring system in accordance with the second aspect of the invention, the data transmitter and the data receiver may physically be connected with each other either via a connection cord or cable, or in a wireless manner, e.g., by utilizing radio wave or light. In the case where the two devices are connected via a connection cable, the waveform of each transfer-data transmission command signal received by the data transmitter, or the waveform of each unit amount of transfer data received by the data receiver is deformed due to an exponential response delay that is attributable to a capacitance or stray C, a resistance R, and an inductance L which are specific to the connection cable connecting between the two devices. The degree of deformation of the signal or data depends on the physical properties of the medium (cable, space, etc.) connecting the two devices and/or the physical conditions under which the two devices and the medium are used. Since in the present data transferring system the transfer-related waiting time is changeable, the transfer data can be transferred from the data transmitter to the data receiver at high speed and with high accuracy or reliability.

According to a preferred feature of the second aspect of the invention, the waiting-time changing means comprises testing means for performing a test which includes generating a plurality of test-data transmission command signals, transmitting each of a plurality of unit amounts of test data, in response to a corresponding one of the test-data transmission command signals, reading in the each unit amount of test data after waiting for a test-related waiting time from a timing of generation of the one test-data transmission command signal, judging whether the read-in each unit amount of test data is identical with a corresponding one of a plurality of unit amounts of comparison data which are same as the test data, and increasing the test-related waiting time between the timing of generation of the one test-data transmission command signal and a timing of reading-in of the each unit amount of test data, by a predetermined time, when it is judged that the read-in each unit amount of test data is not identical with the one unit amount of comparison data, repeating means for repeating the test to obtain a shortest test-related waiting time when it is first judged that the read-in each unit amount of test data is identical with the one unit amount of comparison data, and means for changing, based on the shortest test-related waiting time, the transfer-related waiting time such that the changed transfer-related waiting time is not shorter than the shortest test-related waiting time. If it is judged that the read-in each unit amount of the test data is not identical with the corresponding one unit amount of the comparison data that are the same as the test data, that judgment means that the current test-related waiting time is shorter than an actual total delay time that is equal to the sum of a time of delay of the test-data transmission command signal and a time of delay of the test data. Accordingly, the current test-related waiting time is increased or prolonged by the predetermined time. Eventually, the shortest test-related waiting time that is substantially equal to, or somewhat longer than, the total delay time is determined or obtained. Since the data receiver starts to read in each unit amount of transfer data after waiting for at least the shortest test-related waiting time, the computer can read in the transfer data with high accuracy or reliability. In addition, since the data receiver waits for the shortest waiting time only, the speed of data transfer from the data transmitter to the data receiver can be optimized or maximized under the given conditions. The test data may be exclusive data different from the transfer data, or a portion of the transfer data to be transferred. In the former case, the test data may be pre-stored in a memory of one or each of the data transmitter and receiver, or may be produced using, e.g., a signal generator and a signal counter, by one or each of the data transmitter and receiver. In the latter case, the test data may be transmitted from one of the data transmitter and receiver, to the other, and subsequently be transmitted back to that one device, so that the portion of the transfer data as the test data may be compared with a corresponding portion of the transfer data. The test data may be transmitted between the two devices one or more times. As the times of transmission of the test data increases, the degree of accuracy of the test increases. The test may be performed by the cooperation of the two devices only, or the cooperation of the two devices and a third device which is connectable to one or both of the two devices and which has a control program to control the two devices to perform the test.

According to another feature of the second aspect of the invention, the testing means comprises a command signal generator and a test-data transmitter, the command signal generator generating the test-data transmission command signals and supplying the test-data transmission command signals to the test-data transmitter, the test-data transmitter transmitting the each unit amount of test data, to the command signal generator, in response to the one test-data transmission command signal, the command signal generator reading in the each unit amount of test data after waiting for the test-related waiting time.

According to another feature of the second aspect of the invention, at least one of the command signal generator and the test-data transmitter comprises judging means for judging whether the read-in each unit amount of test data is identical with the one unit amount of comparison data.

According to another feature of the second aspect of the invention, at least one of the command signal generator and the test-data transmitter comprises waiting-time increasing means for increasing the test-related waiting time by the predetermined time, when it is judged that the read-in each unit amount of test data is not identical with the one unit amount of comparison data.

According to another feature of the second aspect of the invention, the command-signal generator comprises one of the data transmitter and the data receiver, and the test-data transmitter comprises the other of the data transmitter and the data receiver.

According to another feature of the second aspect of the invention, the data receiver comprises a command signal generator which generates a host busy signal, H.Busy, having a plurality of low-to-high changes and a plurality of high-to-low changes which provide at least one of the transfer-data transmission command signals and the test-data transmission command signals. In the case where a centronics communication method is performed by the present data transferring system, so that transfer data in parallel form are transmitted from the data transmitter to the data receiver, the transfer data are transmitted not only at the timing of each fall (i.e., high-to-low change) of a host busy signal, H.Busy, transmitted from a host computer as the data receiver, to an electronic apparatus, e.g., image scanner, as the data transmitter, but also at the timing of each rise (i.e., low-to-high change) of the H.Busy signal. Thus, the speed of data transfer is increased, i.e., the time needed to transfer a batch of transfer data (e.g., image data) is shortened.

According to another feature of the second aspect of the invention, the data transferring system further comprises mode-changing means for placing the data transmitter and the data receiver from a test mode in which the test is repeated, into a transfer mode, when the transfer-related waiting time is changed based on the shortest test-related waiting time, and, in the transfer mode, the data transmitter transmits the each unit amount of transfer data, to the data receiver, in response to the one transfer-data transmission command signal, and the data receiver reads in, after waiting for the changed transfer-related waiting time, the each unit amount of transfer data transmitted thereto from the data transmitter.

According to another feature of the second aspect of the invention, the data transferring system further comprises means for placing the data transmitter and the data receiver in the test mode when a predetermined condition is satisfied. The predetermined condition may be that electric power is applied to the present system, that a user inputs a command in the present system through an input device such as a keyboard, or that the present system detects a disconnection of a connection cable connecting the data transmitter and receiver with each other, from at least one of the two devices. For example, when an old connection cable is replaced with a new one of the same sort or a different sort, a new shortest test-related waiting time is measured, and a new transfer-related waiting time is determined based on the new shortest test-related waiting time such that the new transfer-related waiting time is not shorter than the new shortest test-related waiting time. The new waiting time is specific to the new connection cable.

According to another feature of the second aspect of the invention, the data transferring system further comprises a connection cable which connects the data transmitter and the data receiver to each other. The connection cable may be of a coaxial type or a ribbon type.

According to another feature of the second aspect of the invention, at least one of the data transmitter and the data receiver includes a detector which detects a disconnection of the connection cable from the at least one of the data transmitter and the data receiver, and the waiting-time changing means comprises updating means for placing, when the detector detects the disconnection, the data transmitter and the data receiver in the test mode and operating the testing means and the repeating means to obtain a new shortest test-related waiting time so that the transfer-related waiting time is changed based on the new shortest test-related waiting time such that the changed transfer-related waiting time is not shorter than the new shortest test-related waiting time. In the case where an old connection cable is replaced with a new connection cable, the detector detects the replacement and the updating means operates for determining a new, transfer-related waiting time which is specifically suitable for the new connection cable.

According to another feature of the second aspect of the invention, at least one of the data transmitter and the data receiver comprises a memory in which the test data are stored. The test data may be provided by one or more bytes of bit data and each byte may be provided by, e.g., eight bits.

According to another feature of the second aspect of the invention, at least one of the data transmitter and the data receiver comprises means for producing the comparison data. This means may comprise a signal generator and a signal counter which counts the number of the signals generated by the generator. In this case, the numbers counted by the counter provides the comparison data. For example, the numbers of 0 to 255 counted by the counter correspond to 256 bytes of bit data as the comparison data.

According to another feature of the second aspect of the invention, the data transmitter comprises an image scanner and the data receiver comprises a host computer. The image scanner may be a color or monochrome scanner, or a handy scanner, or an image reader of a facsimile machine. The host computer may be a personal computer. In the case where a personal computer is connected with a facsimile machine via a connection cable, an original image can be read from an original, such as a picture, by the facsimile machine and transmitted to the personal computer so that the image may be displayed on a display of the computer. In the latter case, even if the image data are a large amount of gray-scale data, the present system can transfer the data at high speed and with high accuracy or reliability.

The second object has also been achieved according to a third aspect of the present invention, which provides a data transferring system comprising a data receiver which generates, in a transfer mode, a plurality of transfer-data transmission command signals and generates, in a test mode, a plurality of test-data transmission command signals, a data transmitter which transmits, in the transfer mode, each of a plurality of unit amounts of transfer data, to the data receiver, in response to a corresponding one of the transfer-data transmission command signals which are generated by the data receiver and supplied to the data transmitter, so that the data receiver receives the each unit amount of transfer data, the data transmitter including a transmission-mode selector which selects one of a first transmission mode in which the data transmitter transmits, in response to the one transfer-data transmission command signal, the each unit amount of transfer data and a corresponding one of a plurality of response signals, to the data receiver, and a second transmission mode in which the data transmitter transmits, in response to the one transfer-data transmission command signal, the each unit amount of transfer data without transmitting any of the response signals, to the data receiver, and a test-data transmitter which transmits, in the test mode, each of a plurality of unit amounts of test data without transmitting any of the response signals, to the data receiver, in response to a corresponding one of the test-data transmission command signals which are generated by the data receiver and supplied to the data transmitter, so that the data receiver receives the each unit amount of test data, the data receiver including a reading-in-mode selector which selects one of a first reading-in mode which corresponds to the first transmission mode and in which the data receiver transmits, in response to the corresponding one response signal, a following one of the transfer-data transmission command signals, to the data transmitter, and a second reading-in mode which corresponds to the second transmission mode, testing means for generating, in the test mode, the test-data transmission command signals and thereby commanding the test-data transmitter to transmit the each unit amount of test data to the data receiver so that the data receiver reads in the each unit amount of test data, after waiting for a test-related waiting time from a timing of generation of the corresponding one test-data transmission command signal, judging means for judging whether the each unit amount of test data read in by the data receiver is identical with a corresponding one of a plurality of unit amounts of comparison data which are same as the test data, waiting-time increasing means for increasing the test-related waiting time by a predetermined time when the judging means judges that the read-in each unit amount of test data is not identical with the one unit amount of comparison data, repeating means for operating the testing means, the judging means, and the waiting-time increasing means to increase the test-related waiting time, so as to obtain a shortest test-related waiting time when the judging means first judges that the read-in each unit amount of test data is identical with the one unit amount of comparison data, mode-changing means for placing the data transmitter and the data receiver from the test mode into the transfer mode when a predetermined condition is satisfied, and control means for controlling, in the transfer mode, the transmission-mode selector of the data transmitter and the reading-in-mode selector of the data receiver to select one of the first and second transmission modes and a corresponding one of the first and second reading-in modes, respectively.

In the data transferring system in accordance with the third aspect of the invention, the data transmitter and the data receiver may physically be connected with each other either via a connection cord or cable, or in a wireless manner, e.g., by utilizing radio wave or light. In the case where the two devices are connected with each other via a connection cable, the waveform of each transfer-data transmission command signal received by the data transmitter, or the waveform of each unit amount of test data received by the data receiver is deformed due to an exponential response delay that is attributable to a capacitance or stray C, a resistance R, and an inductance L which are specific to the connection cable connecting between the two devices. If the data receiver makes a judgment that each unit amount of test data read in thereby is not identical with a corresponding one of unit amounts of comparison data that are the same as the test data, the judgment means that the current test-related waiting time is shorter than an actual total delay time which is equal to the sum of a delay time of the test-data transmission command signal and a delay time of the test data. Accordingly, the current test-related waiting time is increased or prolonged by the predetermined time. Eventually, the shortest test-related waiting time that is substantially equal to, or somewhat longer than, the total delay time is determined or obtained. Since in the second reading-in mode the data receiver starts to read in each unit amount of the transfer data after waiting for the shortest waiting time, the receiver can read in the transfer data with accuracy. In addition, since in the second reading-in mode the data receiver waits for the shortest waiting time only, the speed of data transfer from the data transmitter to the data receiver is maximized. On the other hand, in the first reading-in mode, the transfer data are transferred from the data transmitter to the data receiver, in a so-called "handshake" manner, with high accuracy or reliability, but at a lower speed than that in the second reading-in mode. The control means may operate in response to a special command which is input by a user in the present system through an input device, such as a keyboard, or automatically operate when a predetermined condition is satisfied. The predetermined condition may relate to the measured value of the shortest test-related waiting time, the calculated amount of the transfer data to be transferred, the size of an original which is to be read by an image scanner as the data transmitter, or the sort (binary or gray-scale data, or full-color or monochromatic image data) of the transfer data. The first two parameters may automatically be obtained by the control means, and the second two parameters may be input by the user through an input device.

According to a preferred feature in accordance with the third aspect of the invention, the control means comprises means for controlling, when an amount of the transfer data is greater than a reference value, the transmission-mode selector and the reading-in-mode selector to select the second transmission mode and the second reading-in mode, respectively, so that the data transmitter transmits, in the second transmission mode, the each unit amount of transfer data, to the data receiver, in response to the one transfer-data transmission command signal, and the data receiver reads in, in the second reading-in mode, after waiting for at least the shortest test-related waiting time, the each unit amount of transfer data transmitted thereto from the data transmitter. Since the data receiver reads in, in the second reading-in mode, each unit amount of the transfer data whose amount is greater than the reference amount, after waiting for the shortest waiting time, the receiver can read in the transfer data with accuracy, even though the transfer data may be a large amount data, e.g., gray-scale data (or half-tone data) up to several mega bytes. In addition, since the host computer waits for the shortest waiting time only, the speed of data transfer from the data transmitter to the receiver is maximized under the given conditions including the physical properties of the connection cable in use and the amount of the transfer data.

According to another feature in accordance with the third aspect of the invention, the control means further comprises means for controlling, when the amount of the transfer data is not greater than the reference value, the transmission-mode selector and the reading-in mode selector to select the first transmission mode and the first reading-in mode, respectively, so that the data transmitter transmits, in the first transmission mode, the each unit amount of transfer data and the corresponding one response signal, to the data receiver, in response to the one transfer-data transmission command signal, and the data receiver reads in, in the first reading-in mode, the each unit amount of transfer data transmitted thereto from the data transmitter, in response to the corresponding one response signal transmitted thereto from the data transmitter.

According to another feature in accordance with the third aspect of the invention, the control means comprises means for controlling, when the test-related waiting time increased by the waiting-time increasing means is shorter than a reference time when the mode-changing means establishes the transfer mode, the transmission-mode selector and the reading-in-mode selector to select the second transmission mode and the second reading-in mode, respectively, and controlling, when the test-related waiting time increased by the waiting-time changing means is not shorter than the reference time when the mode-changing means establishes the transfer mode, the transmission-mode selector and the reading-in-mode selector to select the first transmission mode and the first reading-in mode, respectively. In the present data transferring system, when the test data are transmitted from the data transmitter to the data receiver in response to each test-data transmission command signal transmitted from the receiver to the transmitter, some interaction (or crosstalk) may be produced between the test data and the command signal, depending upon the sort of the connection cable in use, in particular in the case where the speed of data transfer is high. If any interaction is produced, the command signal may adversely be influenced, so that the test data may be transmitted by the data transmitter at an incorrect timing, or the test data may adversely be influenced, so that incorrect test data are read in by the data receiver. If the data receiver obtains, when leaving the test mode, a test-related waiting time which is shorter than the reference time, i.e., if substantially no interaction is produced between the test data and the command signals, the data receiver commands the data transmitter to transmit the transfer data in the second transmission mode, and reads in the transfer data in the second reading-in mode. On the other hand, if the data receiver obtains, when leaving the test mode, a test-related waiting time which is not shorter than the reference time, i.e., if any interaction is produced between the test data and the command signals and the test data and/or the command signals may adversely be affected, the data receiver commands the data transmitter to transmit the transfer data in the first transmission mode, and reads in the transfer data in the first reading-in mode. Since the data receiver reads in, in the second reading-in mode, each unit amount of transfer data after waiting for the shortest waiting time that is shorter than the reference time, which means that no interaction or interference is produced between the test data and the command signals, the receiver can read in the transfer data with accuracy. In addition, since in the first reading-in mode the data receiver waits for the shortest waiting time only, the speed of data transfer from the transmitter to the receiver is maximized under the given conditions. Meanwhile, in the case where the shortest waiting time is not shorter than the reference time, which means that some interaction or interference is produced between the test data and the command signals, the data transfer is performed at a lower speed in the first transmission and reading-in modes, but the accuracy or reliability of the data transfer is kept high.

According to another feature in accordance with the third aspect of the invention, the mode-changing means comprises means for establishing the transfer mode when the judging means makes a positive judgment that the each unit amount of test data read in by the data receiver is identical with the one unit amount of comparison data, the predetermined condition comprising the positive judgment.

According to another feature in accordance with the third aspect of the invention, the mode-changing means comprises means for establishing the transfer mode when the test-related waiting time increased by the waiting-time increasing means becomes not shorter than the reference time, the predetermined condition comprising a condition that the test-related waiting time increased by the waiting-time increasing means becomes not shorter than the reference time.

The third object has been achieved according to a fourth aspect of the present invention, which provides a recording medium for recording a control program to control a computer to receive transfer data from a data transmitter, the control program comprising the steps of operating the computer to generate each of a plurality of transfer-data transmission command signals and supply the transfer-data transmission command signals to the data transmitter, so that the data transmitter transmits a corresponding one of a plurality of unit amounts of the transfer data, to the computer, in response to the each transfer-data transmission command signal, and changing a transfer-related waiting time between a timing of generation of the each transfer-data transmission command signal by the computer and a timing of reading-in of the one unit amount of transfer data by the computer, so that the computer reads in, after waiting for the changed transfer-related waiting time, the one unit amount of transfer data transmitted thereto from the data transmitter.

The recording medium in accordance with the fourth aspect of the present invention, may be provided by a nonvolatile memory such as a read-only-memory (ROM) card. The recording medium may be incorporated in the computer, or the control program recorded on the medium may be read by a reading device of the computer and stored in a memory of the same. In either case, the control program is used to control the computer to change the transfer-related waiting time and receive the transfer data from the data transmitter at high speed and with high accuracy.

According to a preferred feature in accordance with the third aspect of the invention, the step of changing the transfer-related waiting time comprises performing a test which includes generating a plurality of test-data transmission command signals, transmitting each of a plurality of unit amounts of test data, in response to a corresponding one of the test-data transmission command signals, reading in the each unit amount of test data after waiting for a test-related waiting time from a timing of generation of the one test-data transmission command signal, judging whether the read-in each unit amount of test data is identical with a corresponding one of a plurality of unit amounts of comparison data which are same as the test data, and increasing the test-related waiting time between the timing of generation of the one test-data transmission command signal and a timing of reading-in of the each unit amount of test data, by a predetermined time, when it is judged that the read-in each unit amount of test data is not identical with the one unit amount of comparison data, repeating the test to obtain a shortest test-related waiting time when it is first judged that the read-in each unit amount of test data is identical with the one unit amount of comparison data, and changing, based on the shortest test-related waiting time, the transfer-related waiting time such that the changed transfer-related waiting time is not shorter than the shortest test-related waiting time..

According to another feature in accordance with the third aspect of the invention, the control program further comprises a step of operating the computer to generate a host busy signal having a plurality of low-to-high changes and a plurality of high-to-low changes which provide the transfer-data and test-data transmission command signals.

According to another feature in accordance with the third aspect of the invention, the control program further comprises a step of judging whether the increased test-related waiting time is shorter than a reference time.

According to another feature in accordance with the third aspect of the invention, the control program further comprises a step of judging whether a connection cable which connects the computer and the data transmitter with each other, is disconnected from at least one of the computer and the data transmitter.

According to another feature in accordance with the third aspect of the invention, the control program further comprises a step of judging whether an amount of the transfer data is greater than a reference value.

BRIEF DESCRIPTION OF THE DRAWINGS

The above and optional objects, features, and advantages of the present invention will better be understood by reading the following detailed description of the preferred embodiments of the invention when considered in conjunction with the accompanying drawings, in which.

DETAILED DESCRIPTION OF THE PREFERRED EMBODIMENTS

Referring to FIGS. 1 to 11, there will be described an image-data transferring system 1 to which the present invention is applied.

Figure 1:
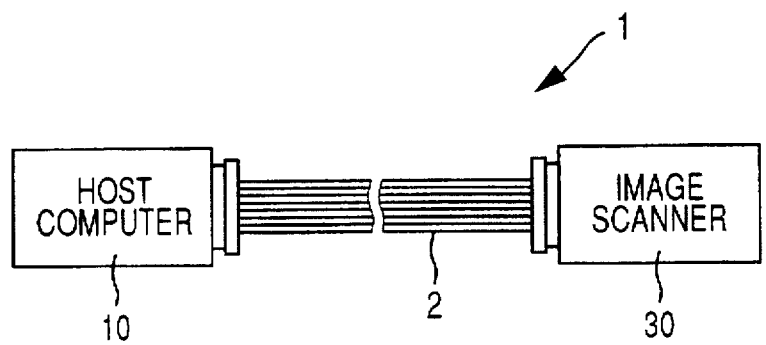
FIG. 1 is a schematic view of a data transmitting system including a host computer and an image scanner to which the present invention is applied.

As shown in FIG. 1, the data transferring system 1 includes a host computer 10, an image scanner 30 as one of electronic devices, and a connection cable or cord 2 which connects the computer 10 and the scanner 30 to each other. The image scanner 30 reads an original image from an original. The host computer 10 of the present system 1 may be connected to a printer (not shown), such as a laser printer, so that the printer may record an image corresponding to the image data transmitted from the image scanner 30 to the computer 10.

Figure 3:
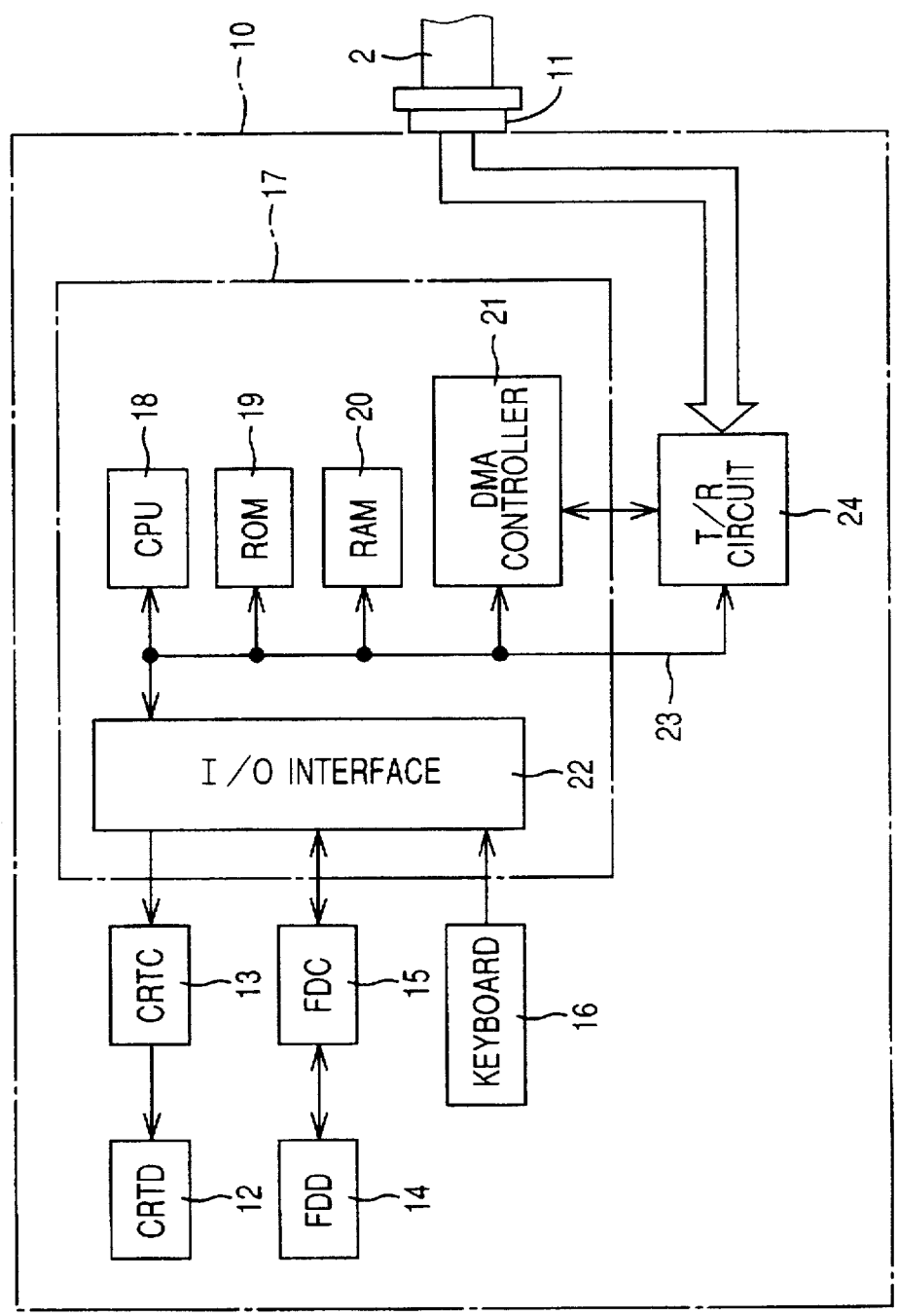
FIG. 3 is a diagrammatic view of the host computer of the system of FIG. 1.

The host computer 10 has an electric arrangement including a control device 17 shown in FIG. 3.

The control device 17 has an input and output (I/O) interface 22 to which a CRT (cathode ray tube) controller (CRTC) 13, a floppy-disk-drive controller (FDC) 15, and a keyboard 16 are connected. The CRTC 13 outputs data indicative of characters, symbols, and/or images to a CRT display 12 so that the display 12 displays the characters, symbols, and/or images. The FDC 15 controls a floppy disk drive (FDD) 14 which drives a floppy disk being inserted therein.

The control device 17 is essentially provided by a central processing unit (CPU) 18, the I/O interface 22, a read only memory (ROM) 19, a random access memory (RAM) 20, a direct memory access (DMA) controller 21, and control bus 23 including 8-bit data bus. The I/O interface 22 is connected to the CPU 18 via the control bus 23. The ROM 19 stores various control programs including various data processing control programs and, in particular, a main control program which will be described in detail later by reference to the flow chart of FIG. 6. In short, according to the main control program, the host computer 10 transmits or receives, based on a communication interface in accordance with IEEE 1284, image data in parallel form (hereinafter, referred to as the "parallel" image data, if appropriate). The RAM 20 includes various memory areas which are needed for the data processing carried out by the CPU 18. The DMA controller 21 operates for transmitting data at a high speed without needing intervention of the CPU 18. A transmitting and receiving (T/R) circuit 24 is connected to the control bus 23. The T/R circuit 24 has a centronics communication port which can transmit and receive, based on an IEEE 1284 communication interface, parallel image data, to and from the image scanner 30. A centronics connector 11 is connected to the T/R circuit 24. The image scanner 30 is connected to the connector 11 via the connection cord 2.

Figure 2:
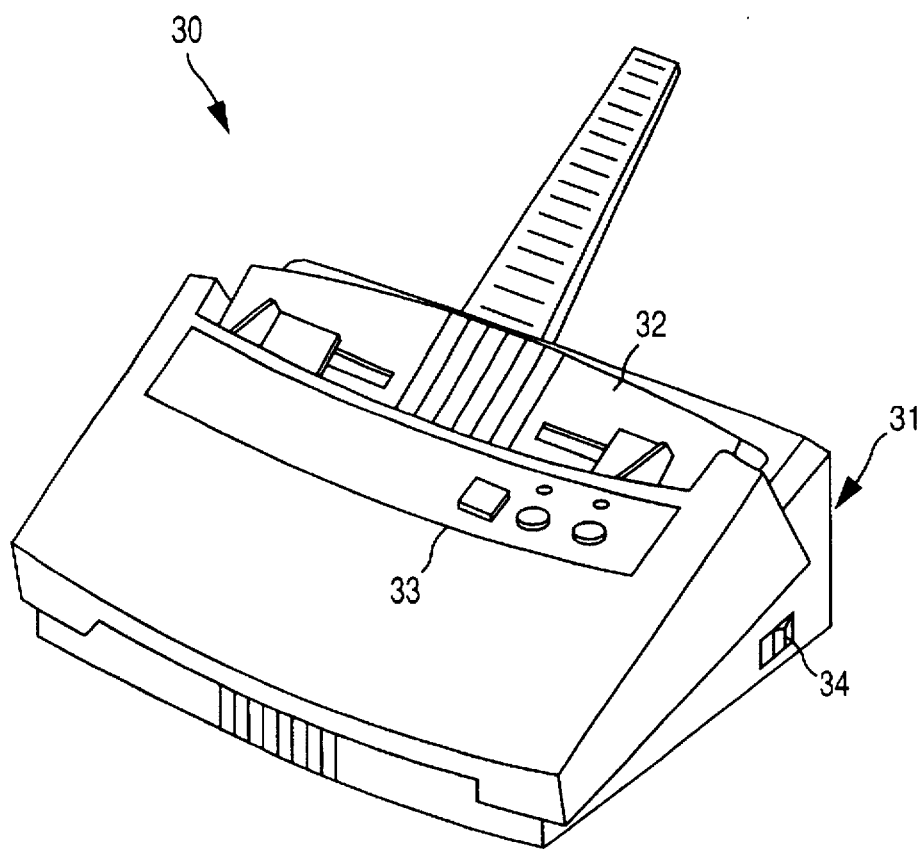
FIG. 2 is a perspective view of the image scanner of the system of FIG. 1.

As shown in FIG. 2, the image scanner 30 includes an original table 32 on which a plurality of originals (not shown) can be placed one on another. The scanner 30 additionally includes a housing 31 in which an original feeding device (not shown) including an original feeding motor 43 (FIG. 4) is accommodated. The feeding device takes, one by one, the bottom one of the originals being placed on the table 32, feeds the original along a predetermined feeding path, and outputs the same from the scanner 30. An image sensor 40 (FIG. 4) which reads an original image from each original is provided midway in the, original feeding path. The image sensor 40 is provided by an array of CCDs (charge-coupled devices) which extends in a direction perpendicular to a direction in which each original is fed by the feeding device.

A power switch 34 is provided on a side surface of the housing 31, and an operation panel 33 is provided on an upper surface of the same 31. The operation panel 33 includes various switches such as a copying command switch.

Figure 4:
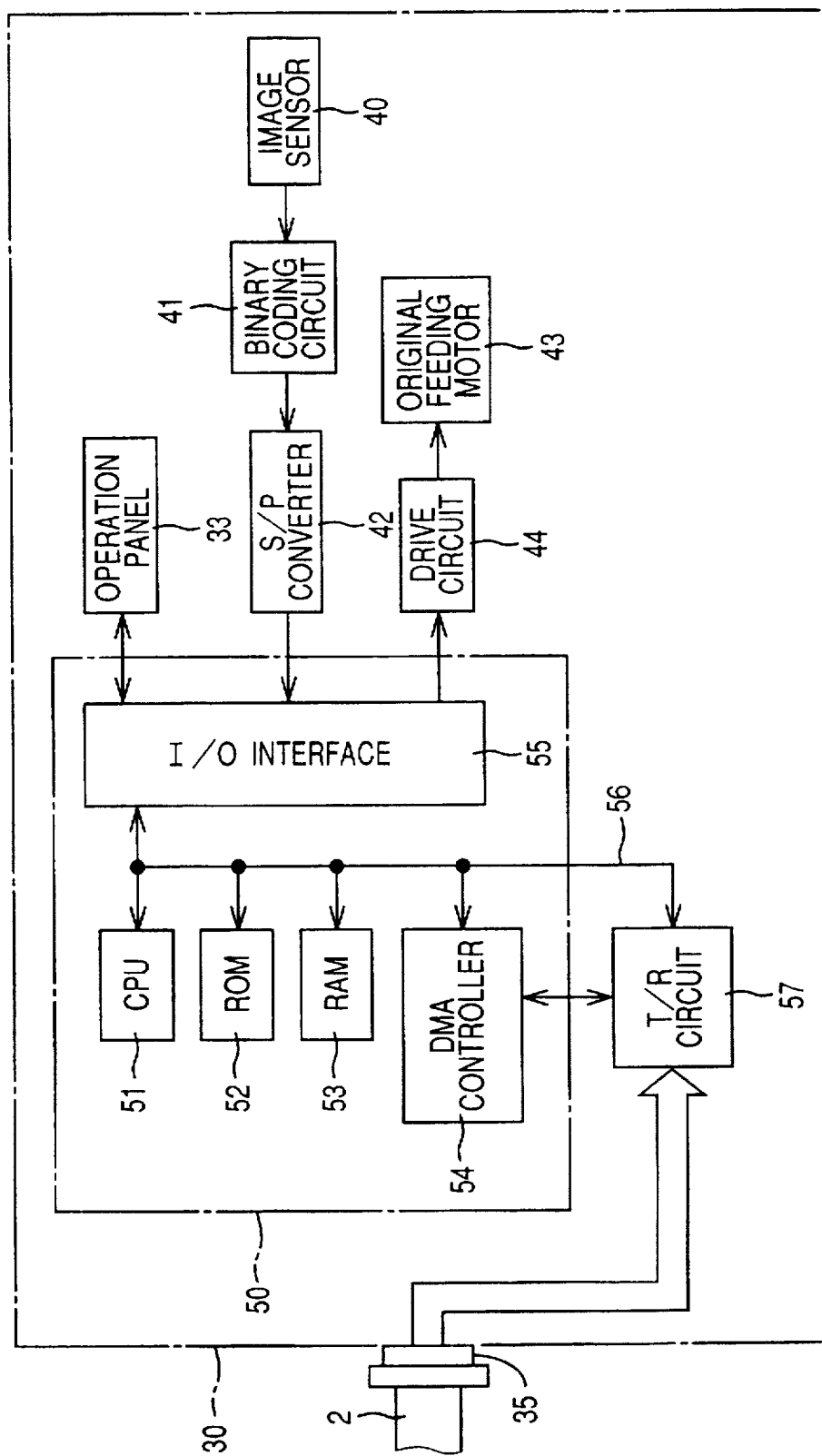
FIG. 4 is a diagrammatic view of the image scanner of the system of FIG. 1.

The image scanner 30 has an electric arrangement including a control device 50 shown in FIG. 4.

The control device 50 includes an input and output (I/O) interface 55 to which the various switches of the operation panel 33, a serial to parallel (S/P) converter 42, and a drive circuit 44 are connected. The S/P converter 42 converts serial image data as the output of a binary-coding circuit 41, into parallel image data. The binary-coding circuit 41 codes image data as the output of the image sensor 40, into binary codes (i.e., digital data). The drive circuit 44 drives an original feeding motor 43 as a drive source of the above-described original feeding device. In addition, a light source (not shown) which is used for reading the originals, a detector switch (not shown) which identifies whether a cover member of the image scanner 30 is not closed, etc. are connected to the I/O interface 55.

The control device 50 is essentially provided by a CPU 51, the I/O interface, a ROM 52, a RAM 53, a DMA controller 54, and control bus 56 including 8-bit data bus. The I/O interface 55 is connected to the CPU 51 via the control bus 56. The DMA controller 54 operates for transmitting data at a high speed without needing intervention of the CPU 51. A T/R circuit 57 is connected to the control bus 56. The T/R circuit 57 has a centronics communication port which can transmit and receive, based on the IEEE 1284 communication interface, image data in parallel form, to and from the host computer 10. A centronics connector 35 is connected to the T/R circuit 57. The host computer 10 is connected to the connector 35 via the connection cord 2.

Figure 5:
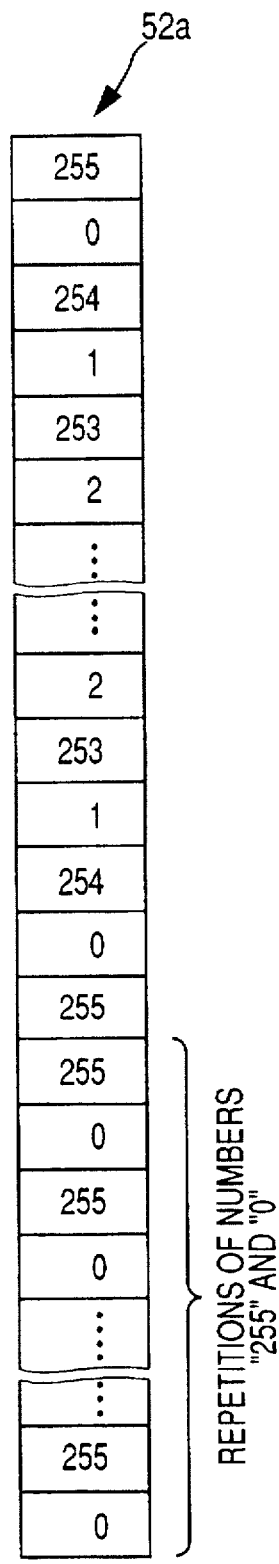
FIG. 5 is an illustrative view for explaining test data stored in a test-data memory of the image scanner of FIG. 1.

The ROM 52 of the image scanner 30 stores various control programs including a driving control program which is needed for operating the original feeding device and, in particular, an image-data transmitting routine which will be described in detail later by reference to the flow chart of FIG. 10. In short, according to the image-data transmitting routine, the image scanner 30 transmits parallel image data using the IEEE 1284 communication interface. The ROM 52 includes a test-data memory area 52a which stores test data indicative of a series of test numbers "255", "0", "254", "1", "253", "2", . . . , "1", "254", "0", "255", "255", "0", "255", "0", . . . , "255", "0" in the order of description, as shown in FIG. 5. The first half of the test numbers include, in the direction from the top toward the bottom in FIG. 5, 256 pairs of numbers each pair of which makes 255, and the second half include 256 repetitions of numbers "255" and The test numbers are ordered such that as many as possible sets of bit data out of 8 sets of bit data, D0 to D7, as one byte which corresponds to each of the test numbers and which is input to the data bus 56, change between "1" and "0". This order is so pre-determined that, in the case where the test data are transmitted at a high speed, it is possible to detect an interaction (i.e., crosstalk) which may be produced between the test data and the host busy signal H.Busy in the connection cord 2.

The RAM 53 of the image scanner 30 includes various memory areas including an image-data memory area which are needed for reading an original image from each original, producing image data representing the read image, and storing the produced image data.

Next, there will briefly be explained control signals which are used when each set of parallel image data, in unit of one byte, is transmitted from the image scanner 30 to the host computer 10 via the connection cord 2 based on the IEEE 1284 communication interface.

The control signals which are sent from the host computer 10 to the image scanner 30 include an active signal, ACT, a host clock signal, H.CLK, and a host busy signal, H.Busy. The active signal ACT activates the IEEE 1284 communication interface and additionally indicates a direction in which data are to be transmitted in the data bus 23. The host clock signal H.CLK indicates a timing of transmission of command data. The host busy signal H.Busy indicates a timing of transmission of data other than command data, e.g., image data.

On the other hand, the control signals which are output from the image scanner 30 to the host computer 10 include a printer clock signal, P.CLK, a printer busy signal, P.Busy, a data avail signal, DAV, and a select (X flag) signal, XFLG. The printer clock signal P.CLK indicates a timing of transmission of data; the printer busy signal P.Busy indicates whether the image scanner 30 is busy; and the data avail signal DAV indicates that there remain data to be transferred.

If the present data transferring system 1 is in a normal state, it is impossible that each of the printer busy signal P.Busy and the select signal XFLG take a "high" level, while no data transmission is carried out between the image scanner 30 and the host computer 10. However, if the connection cord 2 is disconnected from the scanner 30 and/or the computer 10, each of the two signals takes the high level.

The present data transferring system 1 may selectively be operated in one of a normal transfer mode, NT, in which data are transmitted at a low speed in the conventional centronics data transferring method, and a high-speed transfer mode, HT, in which data are transmitted at a higher speed. In the NT mode, the image data obtained by the image scanner 30 from the original are transmitted to the host computer 10, in the previously-described "hand-shake" manner, such that at the timing of each fall of the host busy signal H.Busy generated from the computer 10, one byte of data out of the image data are transmitted by the image scanner 30 and a printer clock signal P.CLK is generated by the scanner 30 and supplied to the computer 10. Thus, each fall of the host busy signal H.Busy functions as a transmission command signal. In the HT mode, the image data obtained by the image scanner 30 are transmitted to the host computer 10, such that at the timing of each of the rises and falls of the host busy signals H.Busy generated from the computer 10, one byte of data out of the image data are transmitted without needing the generation of the printer clock signal P.CLK. In the latter case, each rise of the host busy signal H.Busy also functions as a transmission command signal.

When the NT mode is established on the present system 1, the image scanner 30 is operated in a normal transmission mode, NS, in which data are transmitted at a low speed. The NS mode corresponds to a first transmission mode. On the other hand, when the HT mode is established on the present system 1, the image scanner 30 is operated in a high-speed transmission mode, HS, in which data are transmitted at a higher speed. The HS mode corresponds to a second transmission mode. Meanwhile, when the NT mode is established on the present system 1, the host computer 10 is operated in a normal reading-in mode, NY, in which data are read in at a low speed. The NY mode provides a first reading-in mode that corresponds to the first transmission mode. On the other hand, when the HT mode is established on the present system 1, the host computer 10 is operated in a high-speed reading-in mode, HY, in which data are read in at a higher speed. The HY mode provides a second reading-in mode that corresponds to the second transmission mode.

Hereinafter, there will be described the operation of the present image-data transferring system 1 constructed as described above, and the data transferring method carried out thereon, by reference to the flow charts of FIGS. 6, 7, 8, and 9 which represent the main control program pre-stored in the ROM 19 of the control device 17 of the host computer 10, and the flow chart of FIG. 10 which represents the image-data transmission control program pre-stored in the ROM 52 of the control device 50 of the image scanner 30.

Upon application of electric power to the host computer 10, the control of the CPU 18 of the control device 17 starts with the main control routine represented by the flow charts of FIGS. 6–9. At Step S10, a test-mode flag, TF, is set to "1" to establish a test mode in which the computer 10 reads in the test data transmitted from the image scanner 30. In addition, the high-speed transfer mode HT is established as a transfer mode, TM. Step S10 is followed by Step S11, i.e., the waiting-time determining routine represented by the flow chart of FIG. 7.

First, at Step S30, a waiting-time counter, WT, is set to an initial value, "0". Step S30 is followed by Step S31 to transmit HT data indicative of the high-speed transfer mode, i.e., HT mode, and a test-data transfer (TDT) command, to the image scanner 30. The TDT command requests the image scanner 30 to transmit the test data to the computer 10 via the connection cord 2. Step S31 is followed by Step S32, i.e., the high-speed data receiving routine represented by the flow chart of FIG. 8.

Initially, at Step S60, the host computer 10 outputs an active signal ACT having a "high" level and, at the following Step S61, the computer 10 reads in a data avail signal DAV supplied from the image scanner 30. Step S61 is followed by Step S62 to judge whether the DAV signal has a "low" level indicating that the scanner 30 has some amount of data to be transferred. If a positive judgment is made at Step S62, the control of the CPU 18 goes to Step S63 and the following steps to read in the test data supplied from the scanner 30.

Figure 10:
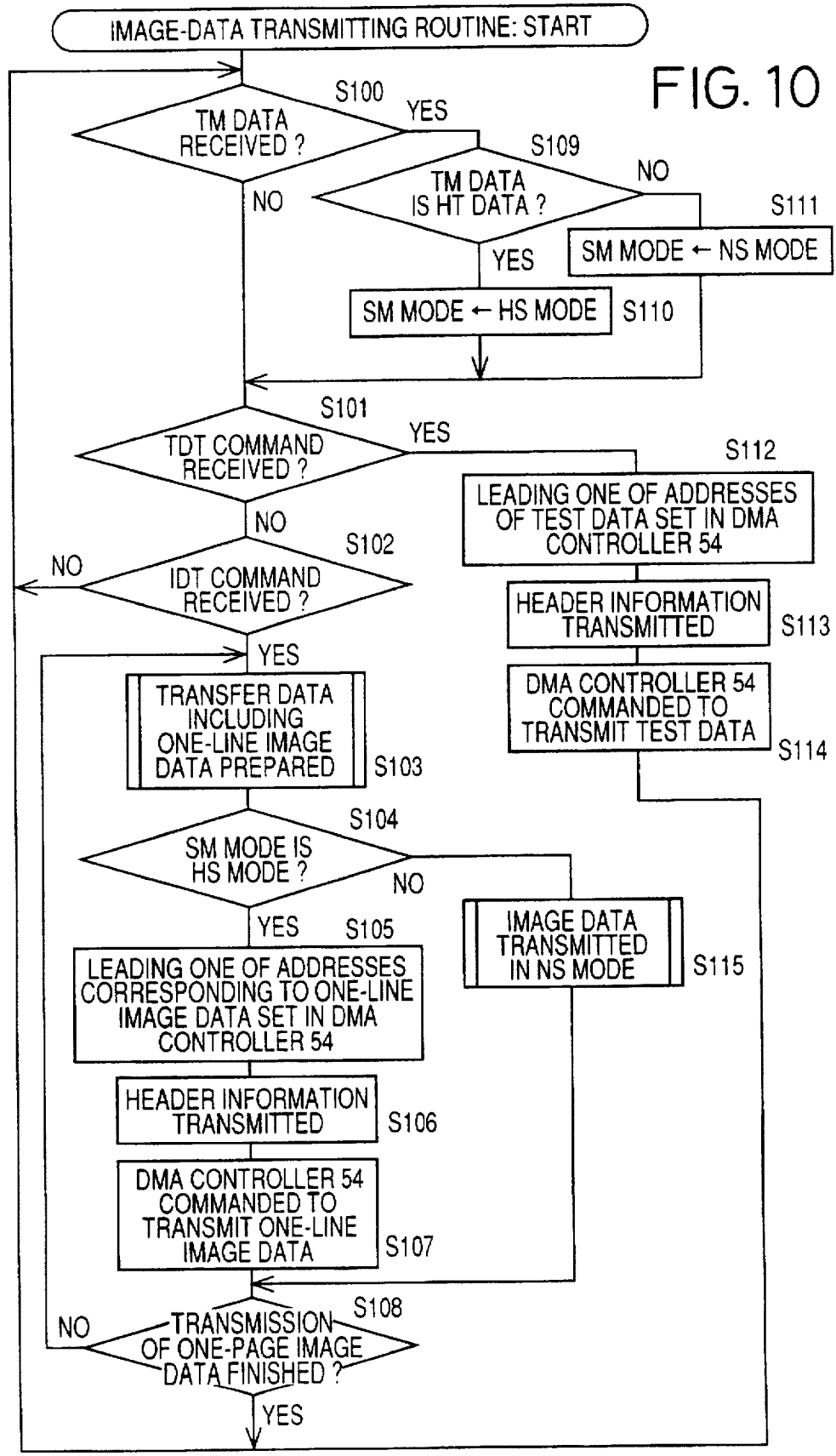
FIG. 10 is a flow chart representing an image-data transmitting routine according to which the image scanner of FIG. 1 operates.

Meanwhile, upon application of electric power to the image scanner 30, the control of the CPU 51 of the control device 50 starts with the image-data transmitting routine represented by the flow chart of FIG. 10. First, at Steps S100, S101, and S102, the CPU 51 iteratively and cyclically judges, in an idling state, whether the scanner 30 has received any TM data indicative of a normal or high-speed transfer mode NT or HT, whether the scanner 30 has received a TDT command, and whether the scanner 30 has received an image-data transfer (IDT) command, respectively.

If, in the idling state, the image scanner 30 receives the TM data and accordingly a positive judgment is made at Step S100, the control of the CPU 51 goes to Step S109 to judge whether the TM data are the HT data indicative of the high-speed transfer mode HT. If a positive judgment is made at Step S109, the control goes to Step S110 to establish the high-speed transmission mode HS as a transmission mode, SM. On the other hand, if the TM data are the NT data indicative of the normal transfer mode NT and accordingly a negative judgment is made at Step S109, the control goes to Step S111 to establish the normal transmission mode NS as the transmission mode SM. Step S110 or S111 is followed by Step S101.

If, in the idling state, the image scanner 30 receives the TDT command and accordingly a positive judgment is made at Step S101, the control of the CPU 51 goes to Step S112 to set, in the DMA controller 54, the leading one of the addresses of the test data pre-stored in the test-data memory area 52a of the ROM 52. Step S112 is followed by Step S113 to transmit a DAV signal having a "low" level and also transmit header information of the test data. The header information includes information indicative of the total amount of the data to be transferred, and information indicating that the data are to be transferred by an electronic device in accordance with IEEE Standard 1284. Subsequently, at Step S114, the CPU 51 commands the DMA controller 54 to transmit the test data to the computer 10. When the data transmission is finished, the control of the CPU 51 goes back to Step S100.

In response thereto, at Step S62, the CPU 18 of the host computer 10 judges whether the computer 10 has received any data. If a positive judgment is made at Step S62, the control goes to Step S63 to read in the header information and, at the following Step S64, the CPU 18 calculates the total amount of data to be read in, based on the header information. Step S64 is followed by Step S65 to iteratively judge whether the P.Busy signal supplied from the image scanner 30 has risen to a "high" level indicating that the scanner 30 is ready to transfer the data. If a positive judgment is made at Step S65, the control goes to Step S66 to cause the H.Busy signal to fall from a "high" level to a "low" level to command the scanner 30 to transfer one byte of data. At the following Step S67, the computer 10 waits for a waiting time, t, which starts with the timing of the fall of the high level to the low level of the H.Busy signal and which corresponds to a current value, WT, of the WT counter. Step S67 is followed by Step S68 to read in the data after the waiting time t elapses and store the data in a data memory of the RAM 20. At Step S69, the CPU 18 judges, from the total amount calculated at Step S64, whether additional data will be transmitted from the scanner 30. If a positive judgment is made at Step S69, Steps S66 to S69 are repeated. However, at Step S66 in the following control cycle, the H.Busy signal is risen from the low level to the high level at a predetermined time after the timing of the preceding signal fall. Thus, the H.Busy signal is alternately inverted from the high level to the low level and from the low level to the high level.

The connection cord or cable 2 has a specific capacitance or stray, C, a specific resistance, R, and a specific inductance, L, each of which is variable depending upon the length of the cord 2, the diameter of the communication line of the cord 2, the type (e.g., ribbon-type or coaxial-type) of the cord 2, and/or the conditions under which the cord 2 is used. Thus, the time constant of the cord 2 is variable. Therefore, the waveform of each transmission command signal provided by each fall or rise of the H.Busy signal received by the image scanner 30, or the waveform of the fall or rise of each byte (or each bit) of image data received by the host computer 10 is deformed because of an exponential response delay of the signal or the data.

Figure 11:
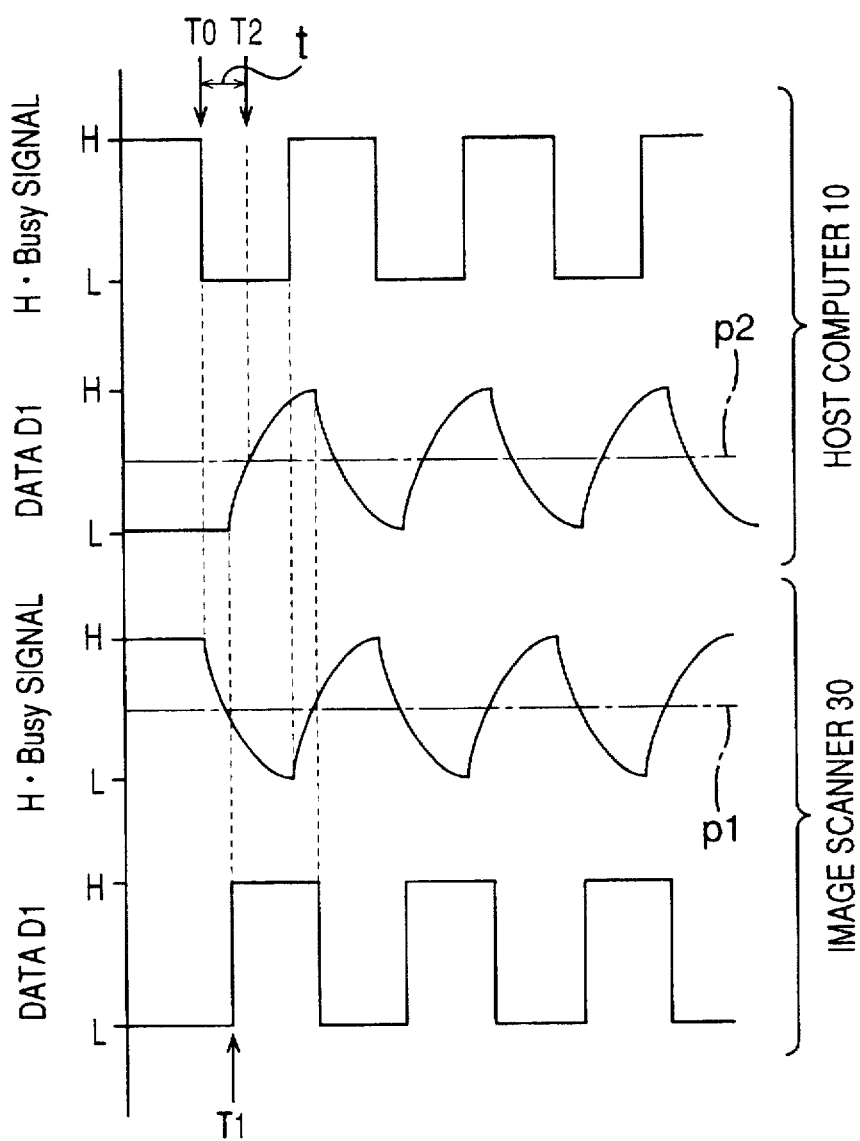
FIG. 11 is a time chart showing signals or data which are transmitted via a connection cord between the host computer and the image scanner of FIG. 1.
Figure 12:
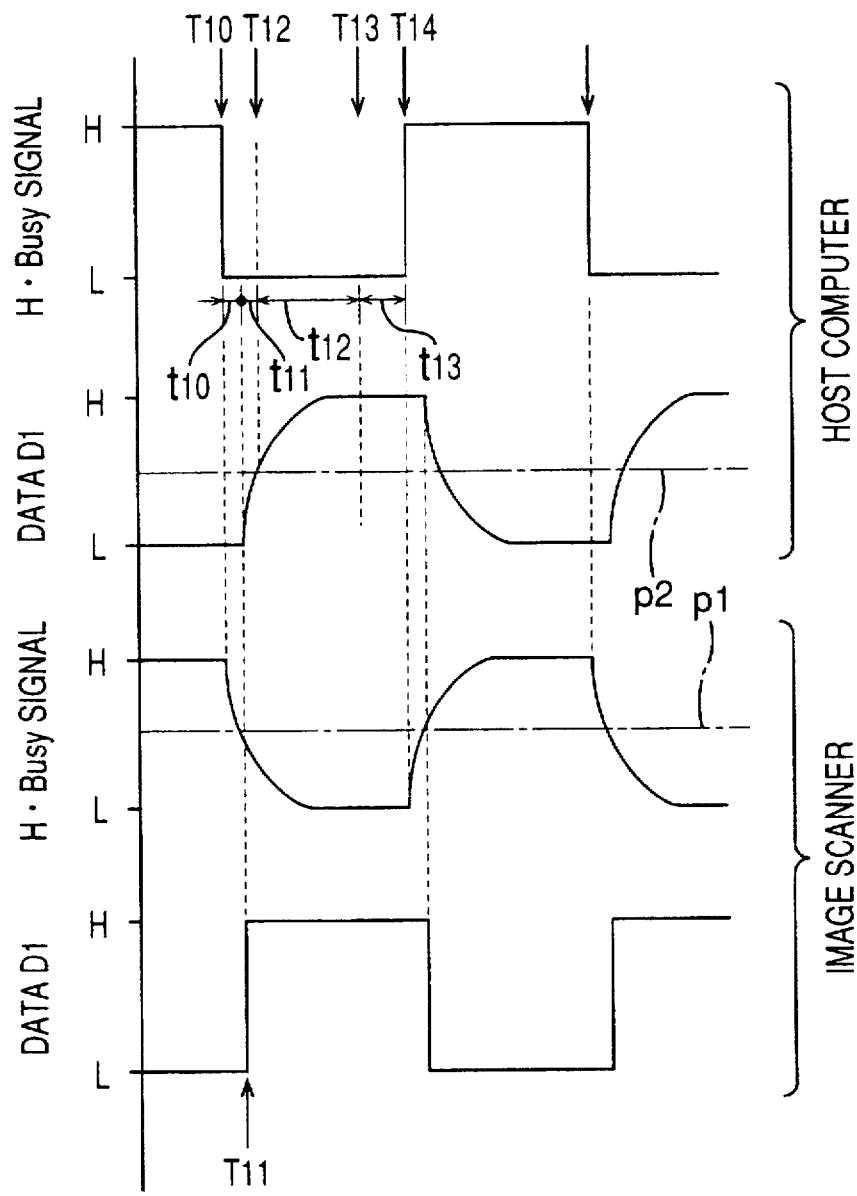
FIG. 12 is a time chart corresponding to FIG. 11, showing signals or data which are transmitted between a host computer and an image scanner of a data transmitting system which was developed by the Applicant prior to the development of the system of FIG. 1.

As shown in the time chart of FIG. 11, at the timing of t0, a H.Busy signal generated by the host computer 10 falls from the high level to the low level and the low-level H.Busy signal is transmitted as a transmission command signal to the image scanner 30 via the connection cord 2. The H.Busy signal is received by the image scanner 30 with a delay as described above and, when the H.Busy signal crosses a predetermined threshold value, p1, at the delayed timing of T1, the scanner 30 identifies the reception of the low-level H.Busy signal from the computer 10. In response thereto, at the timing of T1, the scanner 30 transmits the high-level data, D1, which have been prepared, to the computer 10 via the cord 2. When the data D1 received by the computer 10 crosses a predetermined threshold value, p2, at a delayed timing of T2, the computer 10 identifies the reception of the high-level data. At the timing of T2, the computer 10 can identify, with reliability, the high or low level of the data received thereby.

It emerges from the above description that the data read in by the host computer 10 after the computer 10 waits for a waiting time t between the two timings T0 and T2 are correct but the data read in by the computer before the waiting time telapses may not be correct.

If the host computer 10 has read in all the data from the image scanner 30, i.e., if a positive judgment is made at Step S69, the control of the CPU 18 of the computer 10 goes to Step S70 to carry out various data-reception ending operations including switching the ACT signal from the high level to the low level and changing the directions in which data are transmitted. Thus, all the test data are received and stored in the RAM 20 of the computer 10. Then, the control of the CPU 18 leaves the routine of FIG. 8 and returns to Step S33 of the waiting-time determining routine of FIG. 7.

At Step S33, a number-of-time counter, CT, is set to an initial value, "256". At the following Step S34, the CPU 18 reads the leading one of the sets of number data, TD, from the data memory of the RAM 20. If a number obtained by adding one to a number, TD, indicated by that set of number data TD is not equal to the current counted number CT of the CT counter, that is, if the number data read in after the current waiting time t elapses are not correct, a negative judgment is made at Step S35. Therefore, the control of the CPU 18 goes to Step S48 to add one to the current counted number WT of the WT counter. Step S48 is followed by Step S49 to judge whether the counted number WT is equal to a predetermined maximum value, MAX. If a negative judgment is made at Step S49, Step S31 and the following steps are repeated.

On the other hand, if a positive judgment is made at Step S35, the control of the CPU 18 goes to Step S36 to read the next set of number data from the RAM 20 and to Step S37 to judge whether a number TD indicated by that set of number data TD is equal to a number obtained by subtracting the counted number CT from the number "256". If a negative judgment is made at Step S37, Steps S48 and S49 are carried out and Steps S31 and the following steps are repeated like in the case where a negative judgment is made at Step S35. On the other hand, if a positive judgment is made at Step S37, the control goes to Step S38 to subtract one from the current counted number CT. Step S38 is followed by Step S39 to judge whether the current counted number CT is equal to zero. If a negative judgment is made at Step S39, Steps S34 to S39 are repeated.

Meanwhile, when a positive judgment is made at Step S39, the control of the CPU 18 goes to Step S40 to once more set the CT counter to the initial value "256". Similar to the manner described above with respect to Steps S34 to S39, Steps S41, S42, S43, S45, and S46 are carried out for the 256 pairs or repetitions of numbers "255" and "0" which are received from the image scanner 30 and stored as the 256 sets of number data TD in the RAM 20. Thus, the host computer 10 checks the accuracy or reliability of data transfer from the image scanner 30 via the connection cord 2. If a number indicated by a set of number data TD is not equal to the number "255" and a negative judgment is made at Step S42, or if a number indicated by the following set of number data TD is not equal to the number "0" and a negative judgment is made at Step S44, Steps S48 and S49 are carried out and Step S31 and the following steps are repeated. Thus, Steps S33 to S46 and a portion of the control device 17 which carries out those steps cooperate with each other to provide means for comparing the test data with the comparison data produced by the CT counter.

Eventually, if the counted number CT becomes equal to zero and a positive judgment is made at Step S46, the control of the CPU 18 goes to Step S47 to add one to the current counted number WT of the waiting-time counter. Thus, the CPU 18 ends the present routine of FIG. 7 and returns to Step S12 of the main control routine of FIG. 6. The counted number WT of the waiting-time counter when the waiting-time determining routine of FIG. 7 is ended, indicates the minimum or shortest waiting time t between the timing of T0 when the H.Busy signal is inverted to transmit a transmission command signal to the scanner 30 and the timing of T2 when the computer 10 becomes able to identify with reliability the high or low level of data transmitted from the scanner 30.

If the counted number WT of the waiting-time counter is incremented one by one at Step S48 and eventually exceeds the maximum number MAX, a positive judgment is made at Step S49, which means that the H.Busy signal and the test data interact with each other in the connection cord 2, i.e., that "cross talk" is produced between the signal and the data. The maximum number MAX is predetermined at a long time, for example, more than about 40 μsec. In this case, it is meaningless that image data are transmitted in the high-speed transfer mode HT. In addition, image data cannot be transmitted with reliability in the HT mode. Since image data can be transmitted with high reliability in the normal transfer mode NT, the control of the CPU 18 goes to Step S50 to establish the NT mode as the data transfer mode TM. Then, the control of the CPU 18 goes back to Step S12 of FIG. 6.

At Step S12, the test-mode flag TF is reset to "0" so that the host computer 10 leaves the test mode. Step S12 is followed by Step S13 to read in the respective levels of predetermined sorts of control signals, i.e., printer busy signal P.Busy and the select signal XFLG. Step S13 is followed by Step S14 to judge whether the connection cord 2 is connected with each of the host computer 10 and the image scanner 30. If the respective levels of the P.Busy and XFLG signals are not simultaneously high, a positive judgment is made at Step S14 and the control of the CPU 18 goes to Step S20. On the other hand, if both the respective levels of the P.Busy and XFLG signals are simultaneously high, i.e., if the cord 2 is disconnected from the computer 10 and/or the scanner 30, a negative judgment is made at Step S14 and the control of the CPU 18 repeats Steps S15 and S16 which correspond to Steps S13 and S14, respectively, until the cord 2 is connected to the computer 10 and the scanner 30 by an operator or user. After the cord 2 is connected and a positive judgment is made at Step S16, the control goes to Step S17 to set the test-mode flag TF to "one" and to Step S18 which corresponds to Step S11, i.e., the waiting-time determining routine of FIG. 7. Thus, a new waiting time t is determined. Step S18 is followed by Step S19 to reset the TF flag to "0".

Step S14 or S19 is followed by Step S20 to judge whether any key provided on the keyboard 16 has been operated. If a positive judgment is made at Step S20, the control of the CPU 18 goes to Step S21 to judge what kind of key has been operated. If the operation of a waiting-time determination command key on the keyboard 16 is identified at Step S21, the control goes to Step S22 to set the test-mode flag TF to "one" and to Step S23, i.e., the waiting-time determining routine of FIG. 7 to determine a new waiting time t. Then, the control goes to Step S24 to reset the TF flag to "0" and goes back to Step S13.

Figure 9:
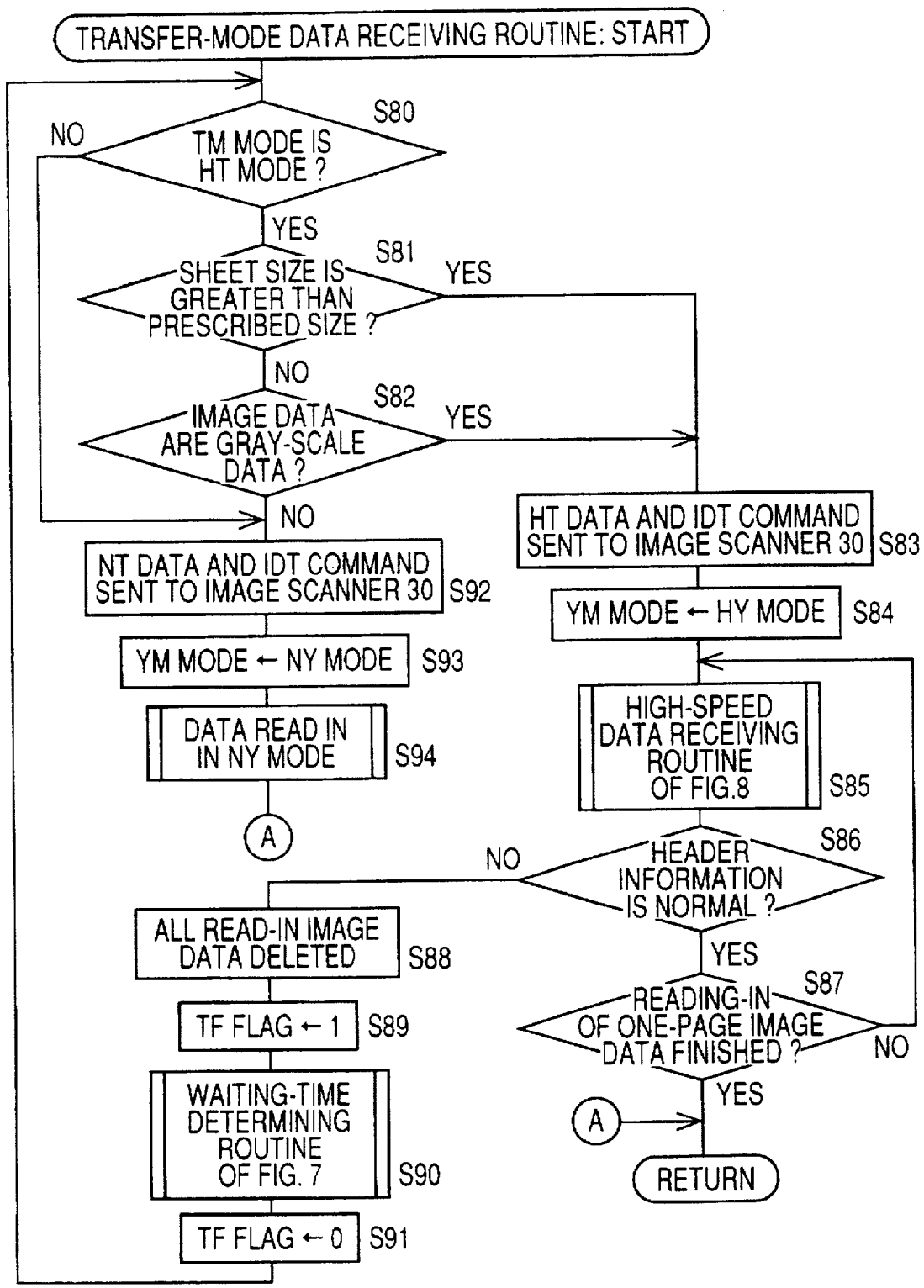
FIG. 9 is a flow chart representing a transfermode data receiving routine according to which the host computer of FIG. 1 operates.

On the other hand, if the operation of an 20 image-data transfer command key on the keyboard 16 is identified at Step S21, the control goes to Step S25, i.e., transfer-mode data receiving routine of FIG. 9.

First, at Step S80, the CPU 18 of the host computer 10 judges whether the computer 10 is currently in 25 the high-speed transfer mode HT as the transfer mode TM. If the computer 10 is in the normal transfer mode NT and a negative judgment is made at Step S80, the control of the CPU 18 goes to Step S92. If a positive judgment is made at Step S80, the control goes to Step S81 to judge whether an original-sheet size selected on the keyboard 16 of the host computer 10 is greater than a predetermined size, e.g., B6 size in accordance with Japanese Industrial Standards (JIS). The original-sheet size corresponds to the size of originals which are read by the image scanner 30 to produce image data representing respective original images. If a negative judgment is made at Step S81, the control goes to Step S82 to judge whether the image data to be received from the image scanner 30 are gray-scale data (i.e., half-tone data). This judgement is made based on the operation of a gray-scale-data key provided on the keyboard 16. If a negative judgment is made at each of Steps S81 and S82 though a positive judgment is made at Step S80, the control goes to Step S92 to establish the NT mode which enjoys the high reliability of data transfer, since the amount of data per page to be transferred is not so large. The NT data indicative of the NT mode and the IDT (image-data transfer) command are sent to the image scanner 30. Then, the control goes to Step S93 to establish the normal reading-in mode NY as the reading-in mode YM and to Step S94 to read in data in the NY mode. Subsequently, the control goes back to Step S13.

On the other hand, if a positive judgment is made at at least one of Steps S81 and S82, the control goes to Step S83 to establish the HT mode and send the HT data indicative of the HT mode and the IDT command to the scanner 30, because the amount of data per page to be read in is large.

Next, the transmission of image data in the HT mode carried out at Step S83 and the following steps will be described below. First, at Step S83, the HT data and the IDT command are sent from the host computer 10 to the image scanner 30 as described above and, at Step S84, the high-speed reading-in mode HY is established as the reading-in mode YM. At the following Step S85, data are read in in the HY mode.

When at Step S83 the host computer 10 sends the HT data to the image scanner 30 and the scanner 30 receives the HT data, the CPU 51 of the scanner 30 makes a positive judgment at each of Steps S100 and S101 of the image-data transmitting routine of FIG. 10. Accordingly, at Step S102, the high-speed transmitting mode HS is established as the transmission mode NS. In addition, when the scanner 30 receives the IDT command from the computer 10, a negative judgment is made at Step S101 and a positive judgment is made at Step S102. Thus, the control of the CPU 51 proceeds with Step S103 and the following steps.

At Step S103, the CPU 51 of the image scanner 30 produces a batch of transfer data including one-line image data representing a line of picture elements read by the image sensor 40 from the original, and header information added to the one-line image data. Step S103 is followed by Step S104 to judge whether the current transmission mode SM is the high-speed transmission mode HS. If a positive judgment is made at Step S104, the control of the CPU 51 goes to Step S105 to set, in the DMA controller 54, the leading one of the addresses corresponding to the one-line image data stored in the RAM 53. Step S105 is followed by Step S106 to cause the data avail signal DAV to fall from the high level to the low level and first transmit the header information. Step S106 is followed by Step S107 to command the DMA controller 54 to transmit the one-line image data to the host computer 10. At the following Step S108, the CPU 51 judges whether the transmission of one-page image data has been finished. If a negative judgment is made at Step S108, the control goes back to Step S103 and the following steps. While Steps S103 to S108 are repeated, a plurality of batches of one-line image data corresponding to the one-page image data are transmitted. Meanwhile, if a positive judgment is made at Step S108, the control of the CPU 51 goes back to Step S100.

Figure 8:
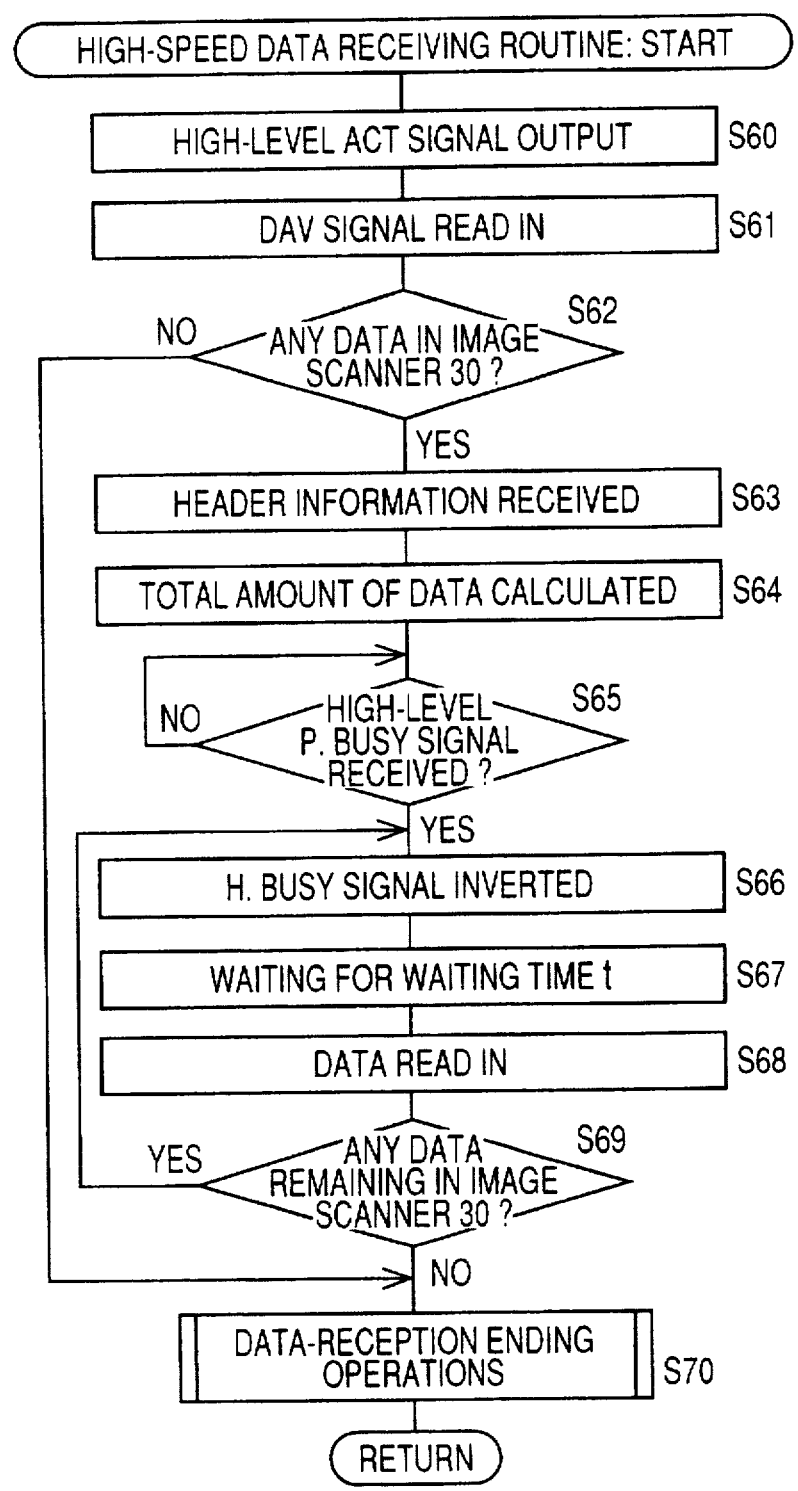
FIG. 8 is a flow chart representing a high-speed data receiving routine according to which the host computer of FIG. 1 operates.

If the host computer 10 receives header information and one-line image data at Step 85 of the data receiving routine of FIG. 9, according to the high-speed data receiving routine of FIG. 8, the control of the CPU 18 of the computer 10 goes to Step S86 to judge whether the received header information is normal. In the case where a peripheral electronic device which is not a product in accordance with IEEE Standard 1284 is connected to the host computer 10, or in the case where the image scanner 30 is disconnected from the connection cord 2, the host computer 10 receives abnormal header information. This judgment may be made by comparing the leading portion of the header information with reference information. If it is found that the leading portion is identical with the reference information, a positive judgment is made at Step S86. Otherwise, the header information may be influenced by noise. If a positive judgment is made at Step S86, the control of the CPU 18 goes to Step S87 to judge whether the reading-in of one-page image data has been finished. If a positive judgment is made at Step S87, the control goes to Step S13 of FIG. 6.

On the other hand, if a negative judgment is made at Step S86, the control of the CPU 18 goes to Step S88 to delete all the received data from the RAM 20 and then to Step S89 to set the test-mode flag TF to "1". Step S89 is followed by Step S90, i.e., the waiting-time determining routine of FIG. 7, so that a new waiting time is determined. Subsequently, at Step S91, the test-mode flag TF is reset to "0", and the control goes back to Step S80 and the following steps. Subsequently, Step S25 of the main control routine of FIG. 6 is carried out again.

Next, the transmission and reception of image data carried out at Step S92 and the following steps in the normal transfer mode NT will be described below. First, at Step S92, the host computer 10 transmits the NT data indicative of the NT mode, and the IDT (image data transfer) command to the image scanner 30. At Step S93, the normal reading-in mode NY is established as the reading-in mode YM. Step S93 is followed by Step S94 to read in, in the NY mode, one byte of image data which is transmitted with the printer clock signal P.CLK from the scanner 30, in the hand-shake manner, each time the host busy signal H.Busy generated by the computer 10 falls from the high level to the low level.

If the host computer 10 transmits the NT data to the image scanner 30 at Step S92 and the scanner 30 receives the NT data, a positive judgment is made at Step S100 of the image-data transmitting routine of FIG. 10. Accordingly, the control, of the CPU 51 goes to Step S109 where a negative judgment is made and then to Step S111 to establish the normal transmission mode NS. Since the scanner 30 receives the IDT command from the computer 10, a positive judgment is made at Step S102. Therefore, Step S103 is carried out. Then, the control goes to Step S104 where a negative judgment is made. Thus, the control goes to Step S115 where the scanner 30 transmits, in the NS mode, one byte of image data with the P.CLK signal, in the hand-shake manner, each time the host busy signal H.Busy generated by the computer 10 falls from the high level to the low level. Step S115 is followed by Step S108 to judge whether the transmission of one-page image data has been finished. If a negative judgment is made at Step S108, Steps S103, S104, S115, and S108 are repeated. Thus, a plurality of batches of one-line image data corresponding to the one-page image data are transmitted from the scanner 30 to the computer 10. Meanwhile, if a positive judgment is made at Step S108, the control of the CPU 51 goes back to Step S100.

Figure 6:
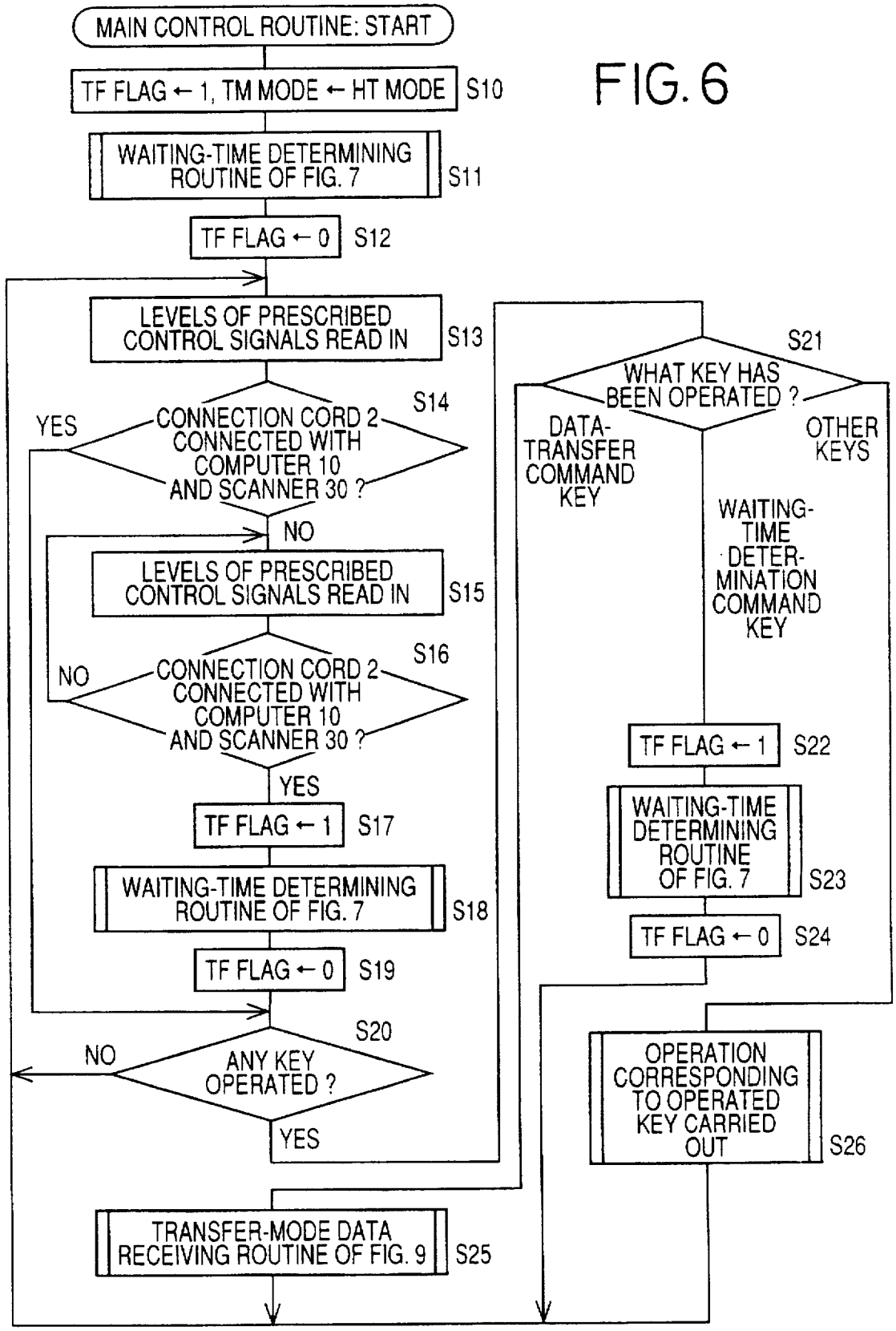
FIG. 6 is a flow chart representing a main control routine according to which the host computer of FIG. 1 operates.
Figure 7:
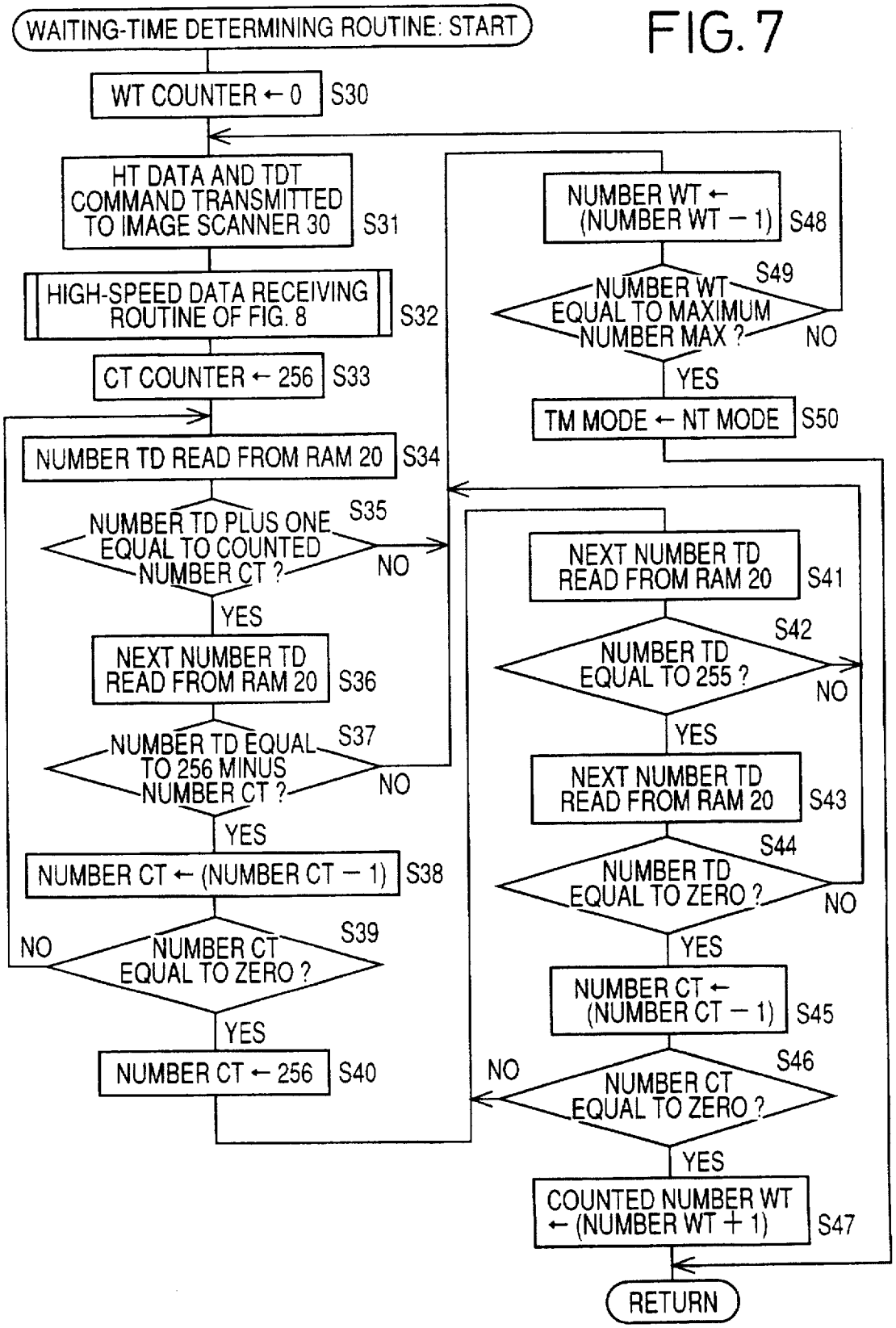
FIG. 7 is a flow chart representing a waiting-time determining routine according to which the host computer of FIG. 1 operates.

After the host computer 10 reads in the one-page image data transmitted from the image scanner 30 at Step S94 of FIG. 9, the control of the CPU 18 goes back to Step S13 of FIG. 6.

If at Step S21 of the main control routine of FIG. 6 the CPU 18 identifies that a key, such as a file saving key, other than the waiting-time determination command key and the image-data transfer command key has been operated by the user, the control goes to Step S26 to carry out an operation corresponding to the operated key. Then, the control goes back to Step S13.

The present image-data transferring system 1 is operable in a manual mode. The keyboard 16 of the host computer 10 has an NT-mode select key and an HT-mode select key each of which is operable by the user for selecting a corresponding one of the NT and HT modes. In the manual mode, the use can operate one of the two TM-mode select keys depending upon the size of originals read by the image scanner 30 and/or the sort (e.g., bit-map data or gray-scale data) of image data produced by the scanner 30.

Next, there will be described the advantages of the waiting-time determining function and the image-data transmitting and reading-in functions of the present image-data transferring system 1.

The waiting time t determined by the host computer 10 is defined as a time duration between the timing of transmission of each test-data transmission command, i.e., the timing of each fall or rise of the host busy signal H.Busy generated by the computer 10, and the timing of commencement of the reading-in of the test data transmitted by the scanner 30 in response to each fall or rise of the H.Busy signal. The computer 10 determines, as the waiting time t, a time duration which assures that the computer 10 reads, as correct data, all the test data transmitted from the scanner 30. The computer 10 determines the waiting time t such that the time t is substantially equal to a time duration obtained by adding a first delayed time between the timing of transmission of each fall or rise of the host busy signal H.Busy by the computer 10 and the timing of reception of each fall or rise of the host busy signal H.Busy by the scanner 30, and a second delayed time between the timing of transmission of the test data by the scanner 30 and the timing of reading-in of the test data by the computer 10. The waiting time t is determined by the computer 10 when the reading-in of the test data as correct data is confirmed by the computer 10 by comparing the test data with the same data produced by the computer 10.

In the high-speed transfer mode HT, the host computer 10 starts to read in the image data transmitted from the image scanner 30, after the computer 10 waits for the waiting time t from the timing of each fall or rise of the H.Busy signal generated thereby. Thus, the computer 10 can read the image data transmitted from the scanner 30, as correct or accurate data, at a high speed.

The waiting time t is the minimum or shortest time that assures that the computer 10 reads in the image data as correct data. The waiting time t does not include any useless time. The host computer 10 determines the waiting time t before the present system 1 starts to actually transfer the image data from the scanner 30 to the computer 10. Thus, the speed of transfer of image data can be maximized for the specific connection cord 2 in use.

In addition, the host computer 10 has the function of detecting the respective levels of the prescribed control signals, i.e., the printer busy signal P.Busy and the select signal XFLG. When the connection cord 2 is disconnected from the computer 10 and/or the image scanner 30, the computer 10 determines a new waiting time t according to the routine of FIG. 7. If the old cord 2 is replaced with a new cord 2, the computer 10 determines a new waiting time t suitable for the new cord 2. In the case where the scanner 30 transmits a large amount of image data such as gray-scale data or color-image data, the image data are transmitted and read in in the high-speed transfer mode HT. Thus, the image data are transmitted and read in, without being changed, at a high speed appropriate for the specific connection cord 2 in use.

Moreover, in the case where the shortest waiting time t determined by the routine of FIG. 7 is smaller than the maximum value MAX, the host computer 10 can read, in the HT mode, the image data transmitted from the image scanner 30, as correct data, because substantially no interaction is produced between the test data and the host busy signal H.Busy. In addition, the speed of data transfer is maximized for the specific connection cord 2 in use. On the other hand, in the case where the waiting time t is increased up to the maximum value MAX and it is accordingly speculated that some interaction is produced between the test data and the host busy signal H.Busy, the computer 10 reads in, in the NT mode, the image data transmitted from the image scanner 30, as correct data, at a low speed.

While the present invention has been described in its preferred embodiments, the present invention may otherwise be embodied.

For example, although in the illustrated embodiment the host computer 10 employs the counter CT for producing comparison data to be compared with the test data transmitted from the image scanner 30, it is possible to pre-store, in the ROM 19, comparison data which are the same data as the test data, for being compared with the test data when the computer 10 reads in the test data transmitted from the canner 30.

While in the illustrated embodiment the exclusive data illustrated in FIG. 5 are used as the test data, it is possible to use, as the test data, a portion of the image data to be transferred. In the latter case, the test data transmitted from the image scanner 30 to the host computer 10 is transmitted back to the scanner 30, so that the scanner 30 compares the test data with the corresponding portion of the image data and increase the waiting time t by a predetermined time corresponding to one counted by the WT counter.

While in the illustrated embodiment the test data are transmitted once from the image scanner 30 to the host computer 10, it is possible to transmit the test data between the image scanner 30 and the host computer 10, two or more times.

While in the illustrated embodiment the waiting time t is determined by the host computer 10, it is possible that the image scanner 30 may determine the waiting time t by commanding the host computer 10 to transmit the test data thereto.

In addition, while in the illustrated embodiment the host computer 10 detects the disconnection of the connection cord 2 from the computer 10 or the image scanner 30, based on the printer busy signal P.Busy and the select signal XFLG, it is possible to use one or more control signals other than those signals P.Busy, XFLG.

It is to be understood that the present invention may be embodied with other changes, improvements, and modifications that may occur to those skilled in the art without departing from the scope and spirit of the present invention defined in the appended claims.

What is claimed is:

1. A method of transferring transfer data from a data transmitter to a data receiver, the data transmitter transmitting each of a plurality of unit amounts of the transfer data, to the data receiver, in response to a corresponding one of a plurality of transfer-data transmission command signals which are generated by the data receiver and supplied to the data transmitter, the method comprising the step of changing a transfer-related waiting time between a timing of generation of said one transfer-data transmission command signal by the data receiver and a timing of reading-in of said each unit amount of transfer data by the data receiver, based on an actual time needed for transmission of a data transmission command signal from the data receiver to the data transmitter and for transmission of a unit amount of data from the data transmitter to the data receiver in response to said data transmission command signal, so that the data receiver reads in, after waiting for the changed transfer-related waiting time, said each unit amount of transfer data transmitted thereto from the data transmitter.

2. A method according to claim 1, wherein the step of changing the transfer-related waiting time comprises:

performing a test which includes generating a plurality of test-data transmission command signals, transmitting each of a plurality of unit amounts of test data, in response to a corresponding one of the test-data transmission command signals, reading in said each unit amount of test data after waiting for a test-related waiting time from a timing of generation of said one test-data transmission command signal, judging whether the read-in each unit amount of test data is identical with a corresponding one of a plurality of unit amounts of comparison data which are same as the test data, and increasing the test-related waiting time between the timing of generation of said one test-data transmission command signal and a timing of reading-in of said each unit amount of test data, by a predetermined time, when it is judged that the read-in each unit amount of test data is not identical with said one unit amount of comparison data, repeating the test to obtain, as said actual time, a shortest test-related waiting time when it is first judged that the read-in each unit amount of test data is identical with said one unit amount of comparison data, and changing, based on the shortest test-related waiting time, the transfer-related waiting time such that the changed transfer-related waiting time is not shorter than the shortest test-related waiting time.

3. A method according to claim 2, wherein the step of performing the test comprises operating one of the data receiver and the data transmitter to generate the test-data transmission command signals and supply the test-data transmission command signals to the other of the data receiver and the data transmitter, operating said other of the data receiver and the data transmitter to transmit said each unit amount of test data, in response to said one test-data transmission command signal, to said one of the data receiver and the data transmitter, and operating said one of the data receiver and the data transmitter to read in said each unit amount of test data after waiting for the test-related waiting time.

4. A method according to claim 2, wherein the step of performing the test comprises operating one of the data receiver and the data transmitter to judge whether said read-in each unit amount of test data is identical with said one unit amount, of comparison data.

5. A method according to claim 2, wherein the step of performing the test comprises operating one of the data receiver and the data transmitter to increase the test-related waiting time by the predetermined time, when it is judged that said read-in each unit amount of test data is not identical with said one unit amount of comparison data.

6. A method according to claim 1, wherein the step of changing the transfer-related waiting time comprises changing, when the transfer data are transferred from the data transmitter as a first data transmitter to the data receiver, the transfer-related waiting time to a first changed transfer-related waiting time, based on a first actual time needed for the transmission of said data transmission command signal from the data receiver to the first data transmitter and for the transmission of said unit amount of data from the first data transmitter to the data receiver in response to said data transmission command signal, and wherein the step of changing the transfer-related waiting time comprises changing, when the transfer data are transferred from a second data transmitter different from the first data transmitter to the data receiver, the transfer-related waiting time to a second changed transfer-related waiting time, based on a second actual time needed for the transmission of said data transmission command signal from the data receiver to the second data transmitter and for the transmission of said unit amount of data from the second data transmitter to the data receiver in response to said data transmission command signal, such that when said second actual time is longer than said first actual time, said second changed transfer-related waiting time is longer than said first changed transfer-related waiting time and, when said second actual time is shorter than said first actual time, said second changed transfer-related waiting time is shorter than said first changed transfer-related waiting time.

7. A method according to claim 1, wherein the step of changing the transfer-related waiting time comprises:

performing a test which includes generating at least one test-data transmission command signal, transmitting at least one unit amount of test data in response to said testdata transmission command signal, and reading in said unit amount of test data after waiting for a test-related waiting time as said actual time which starts from a timing of generation of said test-data transmission command signal, and changing, based on said test-related waiting time, the transfer-related waiting time such that the changed transfer-related waiting time is not shorter than the test-related waiting time.

8. A system including a data transmitter and a data receiver, for transferring transfer data from the data transmitter to the data receiver, the data transmitter transmitting each of a plurality of unit amounts of the transfer data, to the data receiver, in response to a corresponding one of a plurality of transfer-data transmission command signals which are generated by the data receiver and supplied to the data transmitter, wherein the improvement comprises waiting-time changing means for changing a transfer-related waiting time between a timing of generation of said one transfer-data transmission command signal by the data receiver and a timing of reading-in of said each unit amount of transfer data by the data receiver, based on an actual time needed for transmission of a data transmission command signal from the data receiver to the data transmitter and for transmission of a unit amount of data from the data transmitter to the data receiver in response to said data transmission command signal, so that the data receiver reads in, after waiting for the changed transfer-related waiting time, said each unit amount of transfer data transmitted thereto from the data transmitter.

9. A system according to claim 8, wherein said waiting-time changing means comprises:

testing means for performing a test which includes generating a plurality of test-data transmission command signals, transmitting each of a plurality of unit amounts of test data, in response to a corresponding one of the test-data transmission command signals, reading in said each unit amount of test data after waiting for a test-related waiting time from a timing of generation of said one test-data transmission command signal, judging whether the read-in each unit amount of test data is identical with a corresponding one of a plurality of unit amounts of comparison data which are same as the test data, and increasing the test-related waiting time between the timing of generation of said one test-data transmission command signal and a timing of reading-in of said each unit amount of test data, by a predetermined time, when it is judged that the read-in each unit amount of test data is not identical with said one unit amount of comparison data;

repeating means for repeating the test to obtain, as said actual time, a shortest test-related waiting time when it is first judged that the read-in each unit amount of test data is identical with said one unit amount of comparison data; and means for changing, based on the shortest test-related waiting time, the transfer-related waiting time such that the changed transfer-related waiting time is not shorter than the shortest test-related waiting time.

10. A system according to claim 9, wherein the testing means comprises a command signal generator and a test-data transmitter, the command signal generator generating the test-data transmission command signals and supplying the test-data transmission command signals to the test-data transmitter, the test-data transmitter transmitting said each unit amount of test data, to the command signal generator, in response to said one test-data transmission command signal, the command signal generator reading in said each unit amount of test data after waiting for the test-related waiting time.

11. A system according to claim 10, wherein at least one of said command signal generator and said test-data transmitter comprises judging means for judging whether said read-in each unit amount of test data is identical with said one unit amount of comparison data.

12. A system according to claim 10, wherein at least one of said command signal generator and said test-data transmitter comprises waiting-time increasing means for increasing the test-related waiting time by the predetermined time, when it is judged that said read-in each unit amount of test data is not identical with said one unit amount of comparison data.

13. A system according to claim 10, wherein the command-signal generator comprises one of the data transmitter and the data receiver, and the test-data transmitter comprises the other of the data transmitter and the data receiver.

14. A system according to claim 9, wherein the data receiver comprises a command signal generator which generates a host busy signal, H.Busy, having a plurality of low-to-high changes and a plurality of high-to-low changes which provide at least one of the transfer-data transmission command signals and the test-data transmission command signals.

15. A system according to claim 9, further comprising mode-changing means for placing the data transmitter and the data receiver from a test mode in which the test is repeated, into a transfer mode, when the transfer-related waiting time is changed based on the shortest test-related waiting time, and wherein, in the transfer mode, the data transmitter transmits said each unit amount of transfer data, to the data receiver, in response to said one transfer-data transmission command signal, and the data receiver reads in, after waiting for the changed transfer-related waiting time, said each unit amount of transfer data transmitted thereto from the data transmitter.

16. A system according to claim 15, further comprising means for placing the data transmitter and the data receiver in the test mode when a predetermined condition is satisfied.

17. A system according to claim 15, further comprising a connection cable which connects the data transmitter and the data receiver to each other.

18. A system according to claim 17, wherein at least one of the data transmitter and the data receiver includes a detector which detects a disconnection of the connection cable from said at least one of the data transmitter and the data receiver, and wherein the waiting-time changing means comprises updating means for placing, when the detector detects said disconnection, the data transmitter and the data receiver in the test mode and operating the testing means and the repeating means to obtain a new shortest test-related waiting time so that the transfer-related waiting time is changed based on the new shortest test-related waiting time such that the changed transfer-related waiting time is not shorter than said new shortest test-related waiting time.

19. A system according to claim 9, wherein at least one of the data transmitter and the data receiver comprises a memory in which the test data are stored.

20. A system according to claim 9, wherein at least one of the data transmitter and the data receiver comprises means for producing the comparison data.

21. A system according to claim 8, wherein the data transmitter comprises an image scanner and the data receiver comprises a host computer.

22. A system according to claim 8, wherein said waiting-time changing means comprises:

testing means for performing a test which includes generating at least one testdata transmission command signal, transmitting at least one unit amount of test data in response to said test-data transmission command signal, and reading in said unit amount of test data after waiting for a test-related waiting time as said actual time which starts from a timing of generation of said test-data transmission command signal; and means for changing, based on said test-related waiting time, the transfer-related waiting time such that the changed transfer-related waiting time is not shorter than the test-related waiting time.

23. A data transferring system comprising:

a data receiver which generates, in a transfer mode, a plurality of transfer-data transmission command signals and generates, in a test mode, a plurality of test-data transmission command signals;

a data transmitter which transmits, in the transfer mode, each of a plurality of unit amounts of transfer data, to the data receiver, in response to a corresponding one of the transfer-data transmission command signals which are generated by the data receiver and supplied to the data transmitter, so that the data receiver receives said each unit amount of transfer data;

the data transmitter including a transmission-mode selector which selects one of a first transmission mode in which the data transmitter transmits, in response to said one transfer-data transmission command signal, said each unit amount of transfer data and a corresponding one of a plurality of response signals, to the data receiver, and a second transmission mode in which the data transmitter transmits, in response to said one transfer-data transmission command signal, said each unit amount of transfer data without transmitting any of said response signals, to the data receiver, and a test-data transmitter which transmits, in the test mode, each of a plurality of unit amounts of test data without transmitting any of said response signals, to the data receiver, in response to a corresponding one of the test-data transmission command signals which are generated by the data receiver and supplied to the data transmitter, so that the data receiver receives said each unit amount of test data;

the data receiver including a reading-in-mode selector which selects one of a first reading-in mode which corresponds to the first transmission mode and in which the data receiver transmits, in response to said corresponding one response signal, a following one of the transfer-data transmission command signals, to the data transmitter, and a second reading-in mode which corresponds to the second transmission mode, testing means for generating, in the test mode, the test-data transmission command signals and thereby commanding the test-data transmitter to transmit said each unit amount of test data to the data receiver so that the data receiver reads in said each unit amount of test data, after waiting for a test-related waiting time from a timing of generation of said corresponding one test-data transmission command signal, judging means for judging whether said each unit amount of test data read in by the data receiver is identical with a corresponding one of a plurality of unit amounts of comparison data which are same as the test data, waiting-time increasing means for increasing the test-related waiting time by a predetermined time when the judging means judges that the read-in each unit amount of test data is not identical with said one unit amount of comparison data, repeating means for operating the testing means, the judging means, and the waiting-time increasing means to increase the test-related waiting time, so as to obtain a shortest test-related waiting time when the judging means first judges that the read-in each unit amount of test data is identical with said one unit amount of comparison data, mode-changing means for placing the data transmitter and the data receiver from the test mode into the transfer mode, and control means for controlling, in the transfer mode, the transmission-mode selector of the data transmitter and the reading-in-mode selector of the data receiver to select one of the first and second transmission modes and a corresponding one of the first and second reading-in modes, respectively.

24. A data transferring system according to claim 23, wherein said control means comprises means for controlling, when an amount of the transfer data is greater than a reference value, the transmission-mode selector and the reading-in-mode selector to select the second transmission mode and the second reading-in mode, respectively, so that the data transmitter transmits, in the second transmission mode, said each unit amount of transfer data, to the data receiver, in response to said one transfer-data transmission command signal, and the data receiver reads in, in the second reading-in mode, after waiting for at least the shortest test-related waiting time, said each unit amount of transfer data transmitted thereto from the data transmitter.

25. A data transferring system according to claim 24, wherein said control means further comprises means for controlling, when said amount of the transfer data is not greater than said reference value, the transmission-mode selector and the reading-in mode selector to select the first transmission mode and the first reading-in mode, respectively, so that the data transmitter transmits, in the first transmission mode, said each unit amount of transfer data and said corresponding one response signal, to the data receiver, in response to said one transfer-data transmission command signal, and the data receiver reads in, in the first reading-in mode, said each unit amount of transfer data transmitted thereto from the data transmitter, in response to said corresponding one response signal transmitted thereto from the data transmitter.

26. A data transferring system according to claim 23, wherein said control means comprises means for controlling, when the test-related waiting time increased by the waiting-time increasing means is shorter than a reference time when the mode-changing means establishes the transfer mode, the transmission-mode selector and the reading-in-mode selector to select the second transmission mode and the second reading-in mode, respectively, and controlling, when the test-related waiting time increased by the waiting-time increasing means is not shorter than said reference time when the mode-changing means establishes the transfer mode, the transmission-mode selector and the reading-in-mode selector to select the first transmission mode and the first reading-in mode, respectively.

27. A data transferring system according to claim 26, wherein said mode-changing means comprises means for establishing the transfer mode when the test-related waiting time increased by the waiting-time increasing means becomes not shorter than said reference time.

28. A data transferring system according to claim 23, wherein said mode-changing means comprises means for establishing the transfer mode when said judging means makes a positive judgment that said each unit amount of test data read in by the data receiver is identical with said one unit amount of comparison data.

29. A recording medium for recording a control program to control a computer to receive transfer data from a data transmitter, the control program performing, when executed by the computer the steps of:

operating the computer to generate each of a plurality of transfer-data transmission command signals and supply the transfer-data transmission command signals to the data transmitter, so that the data transmitter transmits a corresponding one of a plurality of unit amounts of the transfer data, to the computer, in response to said each transfer-data transmission command signal, and changing a transfer-related waiting time between a timing of generation of said each transfer-data transmission command signal by the computer and a timing of reading-in of said one unit amount of transfer data by the computer, based on an actual time needed for transmission of a data transmission command signal from the data receiver to the data transmitter and for transmission of a unit amount of data from the data transmitter to the data receiver in response to said data transmission command signal, so that the computer reads in, after waiting for the changed transfer-related waiting time, said one unit amount of transfer data transmitted thereto from the data transmitter.

30. A recording medium according to claim 29, wherein the step of changing the transfer-related waiting time comprises:

performing a test which includes generating a plurality of test-data transmission command signals, transmitting each of a plurality of unit amounts of test data, in response to a corresponding one of the test-data transmission command signals, reading in said each unit amount of test data after waiting for a test-related waiting time from a timing of generation of said one test-data transmission command signal, judging whether the read-in each unit amount of test data is identical with a corresponding one of a plurality of unit amounts of comparison data which are same as the test data, and increasing the test-related waiting time between the timing of generation of said one test-data transmission command signal and a timing of reading-in of said each unit amount of test data, by a predetermined time, when it is judged that the read-in each unit amount of test data is not identical with said one unit amount of comparison data, repeating the test to obtain, as said actual time, a shortest test-related waiting time when it is first judged that the read-in each unit amount of test data is identical with said one unit amount of comparison data, and changing, based on the shortest test-related waiting time, the transfer-related waiting time such that the changed transfer-related waiting time is not shorter than the shortest test-related waiting time.

31. A recording medium according to claim 30, wherein the control program further comprises a step of operating the computer to generate a host busy signal having a plurality of low-to-high changes and a plurality of high-to-low changes which provide the transfer-data and test-data transmission command signals.

32. A recording medium according to claim 30, wherein the control program further comprises a step of judging whether the increased test-related waiting time is shorter than a reference time.

33. A recording medium according to claim 29, wherein the control program further comprises a step of judging whether a connection cable which connects the computer and the data transmitter with each other, is disconnected from at least one of the computer and the data transmitter.

34. A recording medium according to claim 29, wherein the control program further comprises a step of judging whether an amount of the transfer data is greater than a reference value.

35. A recording medium according to claim 29, wherein the step of changing the transfer-related waiting time comprises:

performing a test which includes generating at least one test-data transmission command signal, transmitting at least one unit amount of test data in response to said test-data transmission command signal, and reading in said unit amount of test data after waiting for a test-related waiting time as said actual time which starts from a timing of generation of said test-data transmission command signal, and changing, based on said test-related waiting time, the transfer-related waiting time such that the changed transfer-related waiting time is not shorter than the test-related waiting time.

* * * * *